United States Patent
Wang et al.

(10) Patent No.: US 11,323,990 B2
(45) Date of Patent: May 3, 2022

(54) RECEIVING NODE, SENDING NODE, AND TRANSMISSION METHOD

(71) Applicant: HUAWEI TECHNOLOGIES CO., LTD., Guangdong (CN)

(72) Inventors: Fan Wang, Shanghai (CN); Zhenfei Tang, Ottawa (CA); Yi Qin, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 276 days.

(21) Appl. No.: 16/505,213

(22) Filed: Jul. 8, 2019

(65) Prior Publication Data

US 2019/0335434 A1 Oct. 31, 2019

Related U.S. Application Data

(63) Continuation of application No. PCT/CN2018/071623, filed on Jan. 5, 2018.

(30) Foreign Application Priority Data

Jan. 6, 2017 (CN) .......................... 201710010936.6

(51) Int. Cl.
*H04W 72/04* (2009.01)
*H04W 16/28* (2009.01)
*H04W 56/00* (2009.01)

(52) U.S. Cl.
CPC ........ *H04W 72/042* (2013.01); *H04W 72/044* (2013.01); *H04W 72/0446* (2013.01)

(58) Field of Classification Search
CPC ............. H04W 72/042; H04W 72/044; H04W 72/0446; H04W 72/04; H04W 72/0406
See application file for complete search history.

(56) References Cited

U.S. PATENT DOCUMENTS 6,834,083 B1 * 12/2004 Tahara ................. G11B 27/032
375/240
2002/0196731 A1 * 12/2002 Laroia ................. H04L 27/2663
370/206

(Continued)

FOREIGN PATENT DOCUMENTS

CN      101222273 A    7/2008
CN      101291512 A    10/2008

(Continued)

OTHER PUBLICATIONS

Office Action issued in Korean Application No. 2019-7022684 dated Jul. 6, 2020, 10 pages (with English translation).

(Continued)

*Primary Examiner* — Jenee Holland
(74) *Attorney, Agent, or Firm* — Fish & Richardson P.C.

(57) ABSTRACT

An embodiment of this application provides a method for transmission in a time interval. The time interval includes one or more first time units and one or more second time units. The one or more first time units are used to transmit a first-type signal, and a quantity of first time units is associated with a quantity of first-type signals. The one or more second time units are used to transmit a second-type signal. In the method, a receiving node may obtain time unit information, where the time unit information is used to obtain a location of the one or more second time units, that is, determine a time domain location of the second-type time-frequency resource in the time interval. Then, the receiving node may receive or send the second-type signal on the second-type time-frequency resource.

12 Claims, 10 Drawing Sheets

(56) References Cited

U.S. PATENT DOCUMENTS

| | | | | |
|---|---|---|---|---|
| 2004/0202174 | A1* | 10/2004 | Kim | H04L 12/5601 370/395.1 |
| 2005/0226141 | A1* | 10/2005 | Ro | H04B 1/69 370/203 |
| 2008/0310364 | A1* | 12/2008 | Lu | H04L 5/0094 370/330 |
| 2009/0088172 | A1* | 4/2009 | Lusky | H04W 56/0005 455/446 |
| 2010/0015966 | A1* | 1/2010 | Ibrahim | H04L 27/2656 455/422.1 |
| 2010/0303279 | A1* | 12/2010 | Tian | G06T 1/005 382/100 |
| 2013/0190027 | A1 | 7/2013 | Cao et al. | |
| 2013/0308595 | A1* | 11/2013 | Ratasuk | H04W 16/06 370/330 |
| 2014/0086111 | A1* | 3/2014 | Li | H04L 5/0082 370/280 |
| 2014/0112302 | A1* | 4/2014 | Bacquet | H04W 74/085 370/330 |
| 2015/0071133 | A1* | 3/2015 | Li | H04W 72/1278 370/278 |
| 2015/0080040 | A1* | 3/2015 | Chang | H04W 48/16 455/500 |
| 2015/0326356 | A1* | 11/2015 | Guan | H04L 5/005 370/330 |
| 2016/0013906 | A1* | 1/2016 | Guo | H04L 5/0073 370/329 |
| 2016/0135056 | A1* | 5/2016 | Wu | H04L 1/0079 370/252 |
| 2016/0191216 | A1 | 6/2016 | Ma et al. | |
| 2016/0227526 | A1 | 8/2016 | Park et al. | |
| 2016/0269090 | A1 | 9/2016 | Kim et al. | |

FOREIGN PATENT DOCUMENTS

| | | |
|---|---|---|
| CN | 102223719 A | 10/2011 |
| CN | 104703164 A | 6/2015 |
| CN | 105101420 A | 11/2015 |
| KR | 20160138464 A | 12/2016 |
| WO | 2016154835 A1 | 10/2016 |
| WO | 2018062460 A1 | 4/2018 |

OTHER PUBLICATIONS

PCT International Search Report and Written Opinion in International Application No. PCT/CN2018/071,623, dated Mar. 27, 2018, 13 pages (With English Translation).

Office Action issued in Japanese Application No. 2019-536892 dated Sep. 8, 2020, 5 pages (with English translation).

Extended European Search Report issued in European Application No. 18735925.2 dated Nov. 27, 2019, 9 pages.

* cited by examiner

RECEIVING NODE, SENDING NODE, AND TRANSMISSION METHOD

CROSS-REFERENCE TO RELATED APPLICATIONS

This application is a continuation of International Application No. PCT/CN2018/071623, filed on Jan. 5, 2018, which claims priority to Chinese Patent Application No. 201710010936.6, filed on Jan. 6, 2017. The disclosures of the aforementioned applications are hereby incorporated by reference in their entireties.

TECHNICAL FIELD

This application relates to communications technologies, and in particular, to a receiving node, a sending node, and a transmission method.

BACKGROUND

In an implementation, a base station may use an omnidirectional antenna to form signal coverage in a shape similar to a circle, or may use a directional antenna with sector radiation to form signal coverage in a shape similar to a sector. As shown in FIG. 1, signal coverage of a base station B200 is divided into three sectors: R1, R2, and R3. A coverage angle of each sector is 120 degrees. In other words, the base station B200 uses directional antennas to form three wide beams in a shape similar to a sector. Usually, directions and a quantity of wide beams of a base station do not vary at different moments.

In another implementation, a beam formed by using a beamforming technology may be used to obtain a relatively long signal coverage distance. The beamforming technology is mostly used for high frequency resources, and may also be used for low frequency resources. As shown in FIG. 1, the base station B200 may enable, by using the beamforming technology, high frequency signals to form signal coverage in a shape similar to a narrow beam. The signal coverage is briefly referred to as a narrow beam, for example, B1, B2, and B3. A narrow beam is also directional, and a coverage area of the narrow beam is narrower than that of a wide beam. At a same moment, the base station may transmit one narrow beam or a plurality of different narrow beams for communication. At different moments, quantities and directions of narrow beams transmitted by the base station may be different. For example, the base station B200 transmits beams B1 and B2 at a moment T1, and transmits a beam B3 at a moment T2. The base station may communicate with a terminal at a same moment by using one or more narrow beams. For example, the base station B200 and a terminal T100 may communicate with each other by using B1 and B2 (for example, B2 can still be received by the terminal T100 after B2 is reflected by an obstacle). Different narrow beams may be used to send different information, or may be used to send same information.

The foregoing two implementations may coexist in a wireless communications network.

In an initial access process, a terminal may implement time and frequency synchronization between the terminal and a base station based on a synchronization signal sent by the base station. After synchronization is implemented, the terminal may obtain system information sent by the base station. The terminal may learn, by using the system information, how to communicate with the base station.

Currently, there are a plurality of solutions for transmitting a synchronization signal and system information by using different beams. In one of the solutions, a concept of a synchronization signal block is defined. From a perspective of a transmission resource, the synchronization signal block may be considered as a time-frequency resource block used to transmit specific content. For example, as shown in FIG. 2, each synchronization signal block is corresponding to six resource elements (RE). The synchronization signal block may be used to transmit a primary synchronization signal, a secondary synchronization signal, an extended synchronization signal, a beam reference signal, a broadcast signal, or the like. A signal transmitted by a base station in a synchronization signal block can help a terminal access the base station. Different synchronization signal blocks may be continuous or discontinuous in time domain. Content in one synchronization signal block may be transmitted by using one or more beams. Transmission of content in a synchronization signal block may be briefly referred to as transmission of the synchronization signal block. Different synchronization signal blocks may be transmitted by using a same beam or different beams. The base station periodically sends a fixed quantity of synchronization signal blocks based on a maximum quantity of beams supported by the base station. For example, as shown in FIG. 2, the base station B200 can support a maximum of eight beams, and each synchronization signal block is used to transmit a synchronization signal sent on one beam. In this case, the base station B200 periodically sends eight synchronization signal blocks. A remaining unoccupied time-frequency resource may be used for data transmission between the base station B200 and the terminal T100, transmission of a reference signal for assisting in data transmission, or the like.

In the foregoing solution, transmission efficiency needs to be improved.

SUMMARY

Embodiments of this application provide a receiving node, a sending node, and a transmission method, to improve transmission efficiency.

The receiving node, the sending node, and the transmission method may be used to transmit a signal in a time interval. The time interval includes one or more first time units and one or more second time units. The one or more first time units are time domain resources of a first-type time-frequency resource. The first-type time-frequency resource is used to transmit a first-type signal. A quantity of first time units is associated with a quantity of first-type signals. The quantity of first time units varies with different time intervals because the quantity of first time units is associated with the quantity of first-type signals. For example, first-type signals need to be sent on two beams in a first time interval, and in this case, it may be considered that two first-type signals need to be sent in the first time interval; therefore, there may be two first time units in the first time interval. First-type signals need to be sent on four beams in a second time interval, and in this case, it may be considered that four first-type signals need to be sent in the second time interval; therefore, there may be four first time units in the second time interval.

According to a first aspect, an embodiment of this application provides a method for transmission in a time interval. In the method, a mechanism in which a receiving node implements a technical solution of this application is described. The method includes: obtaining, by the receiving node, time unit information, where the time unit information is used to obtain a location of one or more second time units, and the one or more second time units are time domain resources of a second-type time-frequency resource; and receiving or sending, by the receiving node, a second-type signal on the second-type time-frequency resource.

A sending node indicates the time unit information, and the receiving node can dynamically learn of a location of a time unit that is in the time interval and that can be used to transmit the second-type signal, to avoid a resource waste caused by reserving fixed time units in different time intervals for transmission of first-type signals, and improve transmission efficiency. In addition, the method is more flexible for signal transmission.

Optionally, the receiving node may be a terminal, or may be another device that needs to determine the location of the second time unit and receive or send the second-type signal in the second time unit.

Optionally, an index of the one or more second time units is used as the time unit information or a part of the time unit information; or a bitmap of the one or more second time units is used as the time unit information or a part of the time unit information; or a second time unit indicator of the one or more second time units is used as the time unit information or a part of the time unit information, where the second time unit indicator is associated with a time domain configuration of the one or more second time units; or a quantity of the one or more second time units is used as the time unit information or a part of the time unit information; or information used to indicate a quantity of the one or more first time units is used as the time unit information or a part of the time unit information; or an index of the one or more first time units is used as the time unit information or a part of the time unit information; or a bitmap of the one or more first time units is used as the time unit information or a part of the time unit information; or a first time unit indicator of the one or more first time units is used as the time unit information or a part of the time unit information, where the first time unit indicator is associated with a time domain configuration of the one or more first time units; or a location of a $1^{st}$ second time unit in the one or more second time units is used as the time unit information or a part of the time unit information.

Optionally, the quantity of the one or more first time units is used as the information used to indicate the quantity of the one or more first time units; or a quantity of beams of the sending node is used as the information used to indicate the quantity of the one or more first time units or a part of the information used to indicate the quantity of the one or more first time units; or a quantity of beams corresponding to one of the first time units is used as the information used to indicate the quantity of the one or more first time units or a part of the information used to indicate the quantity of the one or more first time units; or a total quantity of first time units in a plurality of time intervals or a quantity of the plurality of time intervals is used as the information used to indicate the quantity of the one or more first time units or a part of the information used to indicate the quantity of the one or more first time units.

Optionally, the method further includes: receiving or locally obtaining, by the receiving node, configuration information, where a location of the one or more second time units in the time interval is obtained based on at least the time unit information and the configuration information.

Optionally, a time domain configuration of the one or more second time units is used as the configuration information or a part of the configuration information; or a total quantity of time units included in the time interval is used as the configuration information or a part of the configuration information; or duration of the time interval is used as the configuration information or a part of the configuration information; or duration of a time unit is used as the configuration information or a part of the configuration information; or a distribution rule of the one or more second time units is used as the configuration information or a part of the configuration information; or a distribution rule of the one or more first time units is used as the configuration information or a part of the configuration information; or duration of an interval between time units is used as the configuration information or a part of the configuration information; or a quantity of beams corresponding to one of the first time units is used as the configuration information or a part of the configuration information; or a time domain configuration of the one or more first time units is used as the configuration information or a part of the configuration information; or an end location of the time interval is used as the configuration information or a part of the configuration information; or the quantity of the one or more second time units is used as the configuration information or a part of the configuration information; or a location of a last second time unit in the one or more second time units is used as the configuration information or a part of the configuration information.

Optionally, the method further includes: receiving, by the receiving node, frequency domain indication information; and sending or receiving, by the receiving node, the second-type signal on a first frequency domain resource, where a location of the first frequency domain resource is obtained based on the frequency domain indication information, and the first frequency domain resource is different from a frequency domain resource of a first-type time-frequency resource or a frequency domain resource of a second-type time-frequency resource.

Optionally, the $1^{st}$ second time unit in the one or more second time units is occupied by downlink control information. The obtaining, by the receiving node, time unit information includes: obtaining, by the receiving node, the time unit information by detecting the downlink control information, where the time unit information is location information of the $1^{st}$ second time unit.

Optionally, the obtaining, by the receiving node, time unit information includes: receiving, by the receiving node, the time unit information.

Optionally, the receiving, by the receiving node, the time unit information includes: receiving, by the receiving node, the time unit information by using a broadcast message, system information, or higher layer signaling.

Optionally, duration of each of the first time unit and the second time unit is duration of a synchronization signal block.

Optionally, duration of the time interval is equal to duration of a synchronization signal pulse.

According to a second aspect, an embodiment of this application provides another method for transmission in a time interval. In the method, a mechanism in which a sending node implements a technical solution of this application is described. The method includes: indicating, by the sending node, time unit information, where the time unit information is used to obtain a location of one or more second time units, and the one or more second time units are time domain resources of a second-type time-frequency resource; and sending or receiving, by the sending node, a second-type signal on the second-type time-frequency resource.

The sending node dynamically indicates, to a receiving node, a location of a time unit that is in the time interval and that is for transmitting a second-type signal, so that the sending node can dynamically adjust a quantity of first time units based on a quantity of first-type signals, to avoid a resource waste caused by reserving fixed time units in different time intervals for transmission of first-type signals, and improve transmission efficiency. In addition, the method is more flexible for signal transmission.

Optionally, the sending node may be a base station, or may be another device that needs to indicate the location of the second time unit to a peer end and receive or send the second-type signal in the second time unit.

Optionally, for related content of the time unit information, refer to related content in the first aspect.

Optionally, for information used to indicate a quantity of one or more first time units, refer to related content in the first aspect.

Optionally, the method further includes: sending, by the sending node, configuration information, where a location of the one or more second time units in the time interval is obtained based on at least the time unit information and the configuration information.

Optionally, for related content of the configuration information, refer to related content in the first aspect.

Optionally, the method further includes: sending, by the sending node, frequency domain indication information; and receiving or sending, by the sending node, the second-type signal on a first frequency domain resource, where the frequency domain indication information is used to obtain a location of the first frequency domain resource, and the first frequency domain resource is different from a frequency domain resource of a first-type time-frequency resource or a frequency domain resource of a second-type time-frequency resource.

Optionally, the indicating, by the sending node, time unit information includes: sending, by the sending node, downlink control information, where the downlink control information occupies a $1^{st}$ second time unit in the one or more second time units, and location information of the $1^{st}$ second time unit is the time unit information.

Optionally, the indicating, by the sending node, time unit information includes: sending, by the sending node, the time unit information.

Optionally, the sending, by the sending node, the time unit information includes: sending, by the sending node, the time unit information by using a broadcast message, system information, or higher layer signaling.

Optionally, duration of each of the first time unit and the second time unit is duration of a synchronization signal block.

Optionally, duration of the time interval is equal to duration of a synchronization signal pulse.

According to a third aspect, an embodiment of this application provides a receiving node. For a mechanism in which the receiving node implements a technical solution of this application, refer to content in the first aspect.

In a first optional design, the receiving node includes a processor and a transceiver. The processor is configured to: obtain time unit information by using the transceiver, where the time unit information is used to obtain a location of one or more second time units, and the one or more second time units are time domain resources of a second-type time-frequency resource; and receive or send a second-type signal on the second-type time-frequency resource by using the transceiver.

In the first optional design, optionally, the processor may be further configured to receive configuration information by using the transceiver or locally obtain configuration information, where a location of the one or more second time units in a time interval is obtained based on at least the time unit information and the configuration information.

In the first optional design, optionally, the processor may be further configured to: receive frequency domain indication information by using the transceiver, and send or receive the second-type signal on a first frequency domain resource by using the transceiver, where a location of the first frequency domain resource is obtained based on the frequency domain indication information, and the first frequency domain resource is different from a frequency domain resource of a first-type time-frequency resource or a frequency domain resource of a second-type time-frequency resource.

In the first optional design, optionally, a $1^{st}$ second time unit in the one or more second time units is occupied by downlink control information. The processor is configured to obtain the time unit information by detecting the downlink control information by using the transceiver, where the time unit information is location information of the $1^{st}$ second time unit.

In the first optional design, optionally, the processor is configured to receive the time unit information by using the transceiver.

In the first optional design, optionally, the processor receives a broadcast message, system information, or higher layer signaling by using the transceiver, where the broadcast message, the system information, or the higher layer signaling includes the time unit information.

In a second optional design, the receiving node includes a processor and a memory. The memory stores a related program instruction for implementing the method in the first aspect, and the processor runs the program instruction stored in the memory, to implement a related function of the receiving node in the first aspect.

Optionally, for related content of the time unit information, refer to related content in the first aspect.

Optionally, for information used to indicate a quantity of one or more first time units, refer to related content in the first aspect.

Optionally, for related content of the configuration information, refer to related content in the first aspect.

Optionally, duration of each of the first time unit and the second time unit is duration of a synchronization signal block.

Optionally, duration of the time interval is equal to duration of a synchronization signal pulse.

Optionally, the receiving node is a terminal.

According to a fourth aspect, an embodiment of this application provides a sending node. For a mechanism in which the sending node implements a technical solution of this application, refer to content in the second aspect.

In a first optional design, the sending node includes a processor and a transceiver. The processor is configured to: indicate time unit information by using the transceiver, where the time unit information is used to obtain a location of one or more second time units, and the one or more second time units are time domain resources of a second-type time-frequency resource; and send or receive a second-type signal on the second-type time-frequency resource by using the transceiver.

In the first optional design, optionally, the processor is configured to send configuration information by using the transceiver, where a location of the one or more second time units in the time interval is obtained based on at least the time unit information and the configuration information.

In the first optional design, optionally, the processor is further configured to: send frequency domain indication information by using the transceiver, and receive or send the second-type signal on a first frequency domain resource by using the transceiver, where the frequency domain indication information is used to obtain a location of the first frequency domain resource, and the first frequency domain resource is different from a frequency domain resource of a first-type time-frequency resource or a frequency domain resource of a second-type time-frequency resource.

In the first optional design, optionally, the processor is configured to send downlink control information by using the transceiver, where the downlink control information occupies a $1^{st}$ second time unit in the one or more second time units, and location information of the $1^{st}$ second time unit is the time unit information.

In the first optional design, optionally, the processor is configured to send the time unit information by using the transceiver.

In the first optional design, optionally, the processor is configured to send a broadcast message, system information, or higher layer signaling by using the transceiver, where the broadcast message, the system information, or the higher layer signaling includes the time unit information.

In a second optional design, the sending node includes a processor and a memory. The memory stores a related program instruction for implementing the method in the second aspect, and the processor runs the program instruction stored in the memory, to implement a related function of the sending node in the second aspect.

Optionally, for related content of the time unit information, refer to related content in the first aspect.

Optionally, for information used to indicate a quantity of one or more first time units, refer to related content in the first aspect.

Optionally, for related content of the configuration information, refer to related content in the first aspect.

Optionally, duration of each of the first time unit and the second time unit is duration of a synchronization signal block.

Optionally, duration of the time interval is equal to duration of a synchronization signal pulse.

Optionally, the sending node is a base station.

According to a fifth aspect, an embodiment of this application further provides a communications system, including the foregoing sending node and receiving node.

According to a sixth aspect, an embodiment of this application further provides a computer program product, where the program product includes a related instruction for implementing the method in the first aspect.

According to a seventh aspect, an embodiment of this application further provides a computer-readable storage medium, where the storage medium stores the instruction of the computer program product in the sixth aspect.

According to an eighth aspect, an embodiment of this application further provides another computer program product, where the program product includes a related instruction for implementing the method in the second aspect.

According to a ninth aspect, an embodiment of this application further provides another computer-readable storage medium, where the storage medium stores the instruction of the computer program product in the eighth aspect.

According to a tenth aspect, an embodiment of this application further provides a communication method, where the method includes: receiving, by a receiving node, frequency domain indication information; and sending or receiving a second-type signal on a first frequency domain resource. A location of the first frequency domain resource is obtained based on the frequency domain indication information, and the first frequency domain resource is different from a frequency domain resource of a first-type time-frequency resource used to transmit a first-type signal or a frequency domain resource of a second-type time-frequency resource used to transmit the second-type signal. If the method is described from a perspective of a sending node side, the method includes: sending, by a sending node, the frequency domain indication information, and receiving or sending the second-type signal on the first frequency domain resource.

According to an eleventh aspect, an embodiment of this application further provides a sending node and a receiving node for implementing the method in the tenth aspect.

According to a twelfth aspect, an embodiment of this application further provides a computer program product, where the program product includes a program instruction for implementing the method in the tenth aspect.

According to a thirteenth aspect, an embodiment of this application further provides a computer-readable storage medium, where the medium stores the program instruction in the twelfth aspect.

In the technical solutions of this application, the sending node dynamically indicates, to the receiving node, the time unit that is in the time interval and that can be used to transmit the second-type signal, and allocation of time domain resources in the time interval may vary with the quantity of first-type signals, to avoid a resource waste caused by reserving a fixed resource for the first-type signal, and improve transmission efficiency. In addition, signal transmission is more flexible.

BRIEF DESCRIPTION OF DRAWINGS

To describe the technical solutions in this application more clearly, the following briefly describes the accompanying drawings required for describing the embodiments.

DESCRIPTION OF EMBODIMENTS

Figure 1:
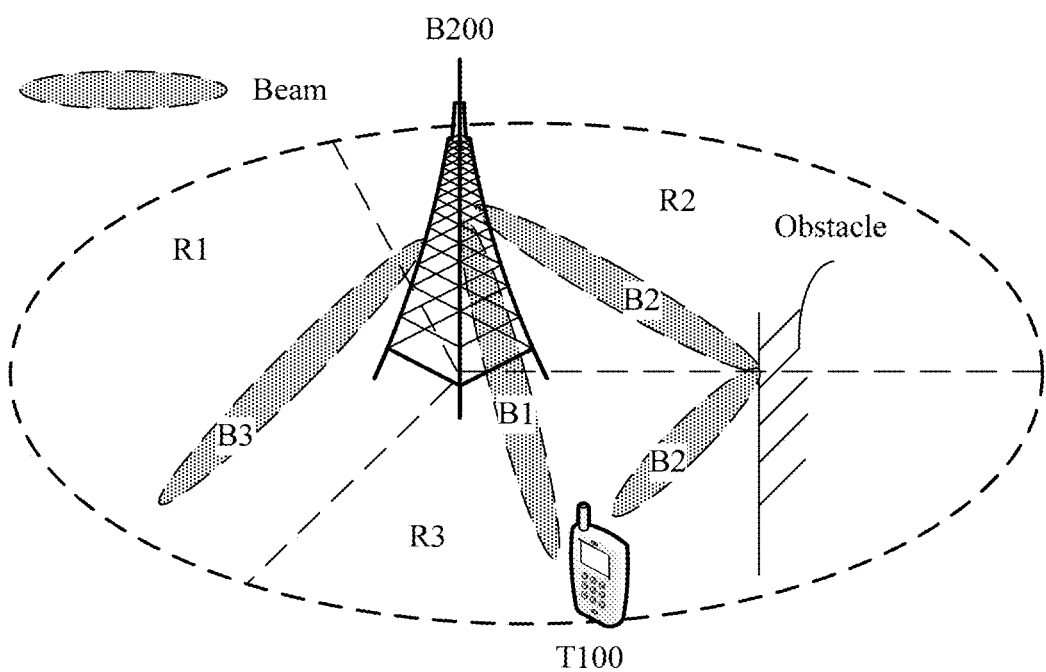
FIG. 1 is a simplified schematic diagram of a wireless communications system.
Figure 2:
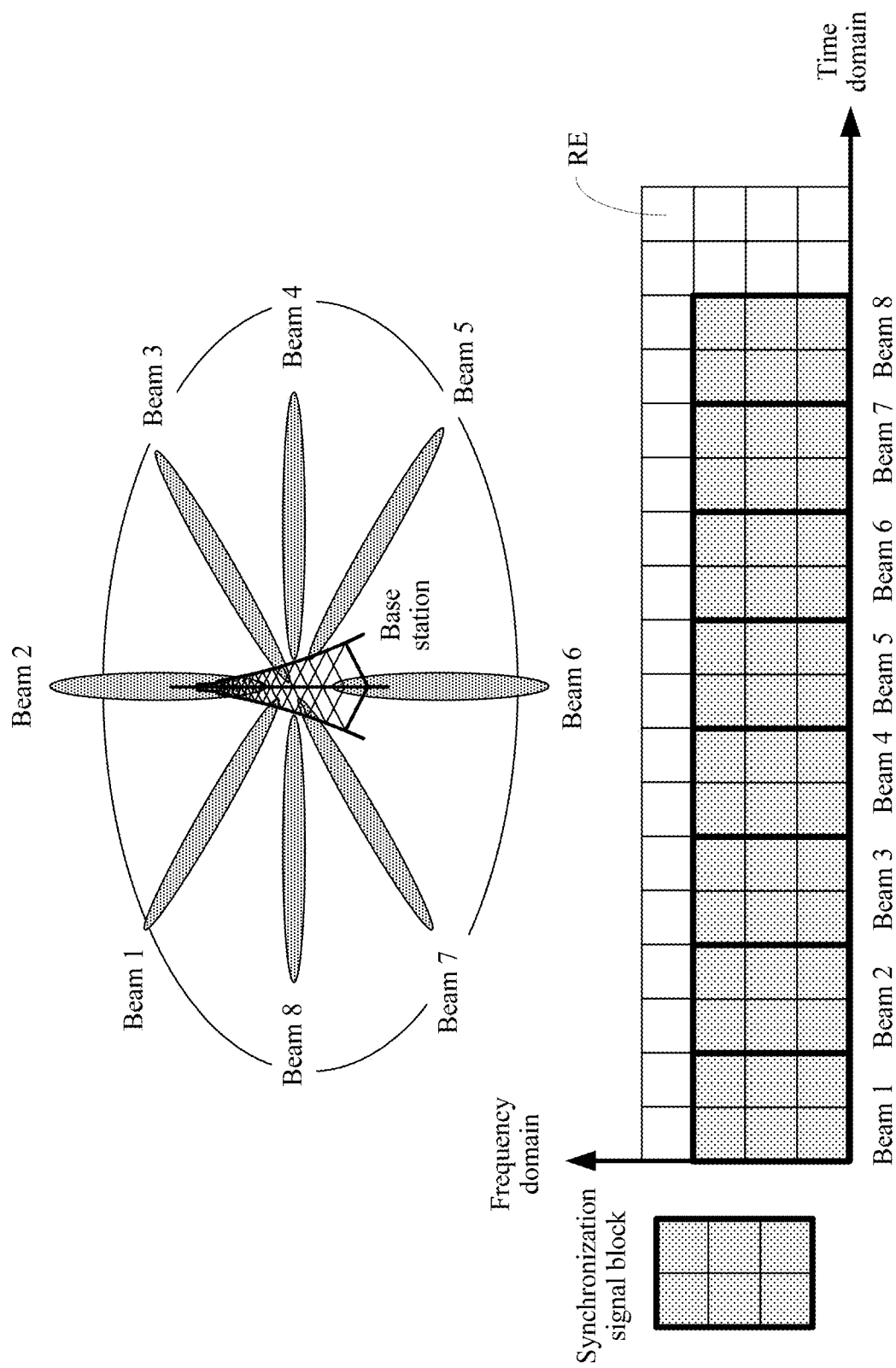
FIG. 2 is a schematic diagram of transmission of a synchronization signal block.

The following describes the embodiments of this application with reference to the accompanying drawings in this application.

The following first describes some terms and agreements in this application.

In this application, a beam may be a wide beam, a narrow beam, or another type of beam. A technology for forming a beam may be a beamforming technology or another technical means. A beam is a space resource, and different beams may be considered as different space resources. The technical solutions of this application are applicable to not only a scenario in which transmission is performed by using different beams, but also a scenario in which transmission is performed by using different space resources. A beam, a port, and the like are space resources.

In this application, signals used to assist a terminal in accessing a base station may be classified into a first-type signal. For example, the first-type signal may be a synchronization signal, a broadcast channel signal, or a space resource reference signal. The synchronization signal may be a primary synchronization signal, a secondary synchronization signal, or an extended synchronization signal. The broadcast channel signal may be a physical broadcast channel signal. The space resource reference signal may be used to identify different space resources. Different space resource reference signals are corresponding to different space resources. The space resource reference signal may be a beam reference signal, a port reference signal, or the like.

In this application, a data channel signal and a signal that is used to assist in performing data transmission between a terminal and a base station may be classified into second-type signals. For example, the second-type signal may be a data channel signal, a control channel signal, a pilot signal, or a reference signal for assisting in performing data transmission between a terminal and a base station. A data channel may be a physical downlink shared channel, a physical uplink shared channel, or the like. A control channel may be a physical downlink control channel, a physical uplink control channel, or the like. The reference signal for assisting in performing data transmission between a terminal and a base station may be a channel state information-reference signal, a sounding reference signal, or the like. The reference signal for assisting in performing data transmission between a terminal and a base station may be briefly referred to as a data reference signal.

Persons skilled in the art should know that the first-type signal and the second-type signal are categories of different signals. Names of different signal categories are interchangeable. Alternatively, the signal for assisting a terminal in accessing a base station may be referred to as a second-type signal, and the data channel signal and the signal that is used to assist in performing data transmission between a terminal and the base station may be referred to as first-type signals. After the names of the categories are interchanged, the technical solutions of this application can also be used.

Persons skilled in the art should know that, specific signals classified into first-type signals and specific signals classified into second-type signals may be classified based on an actual network requirement. This is not limited in the embodiments of the present application.

Persons skilled in the art should know that the technical solutions of this application relate to two types of signals. The technical solutions of this application are also applicable to a scenario in which a plurality of signals are classified into at least three types of signals.

In this application, signals transmitted on different space resources may be considered as different signals. For example, a primary synchronization signal transmitted by using a first beam and a primary synchronization signal transmitted by using a second beam may be considered as different signals.

Figure 3:
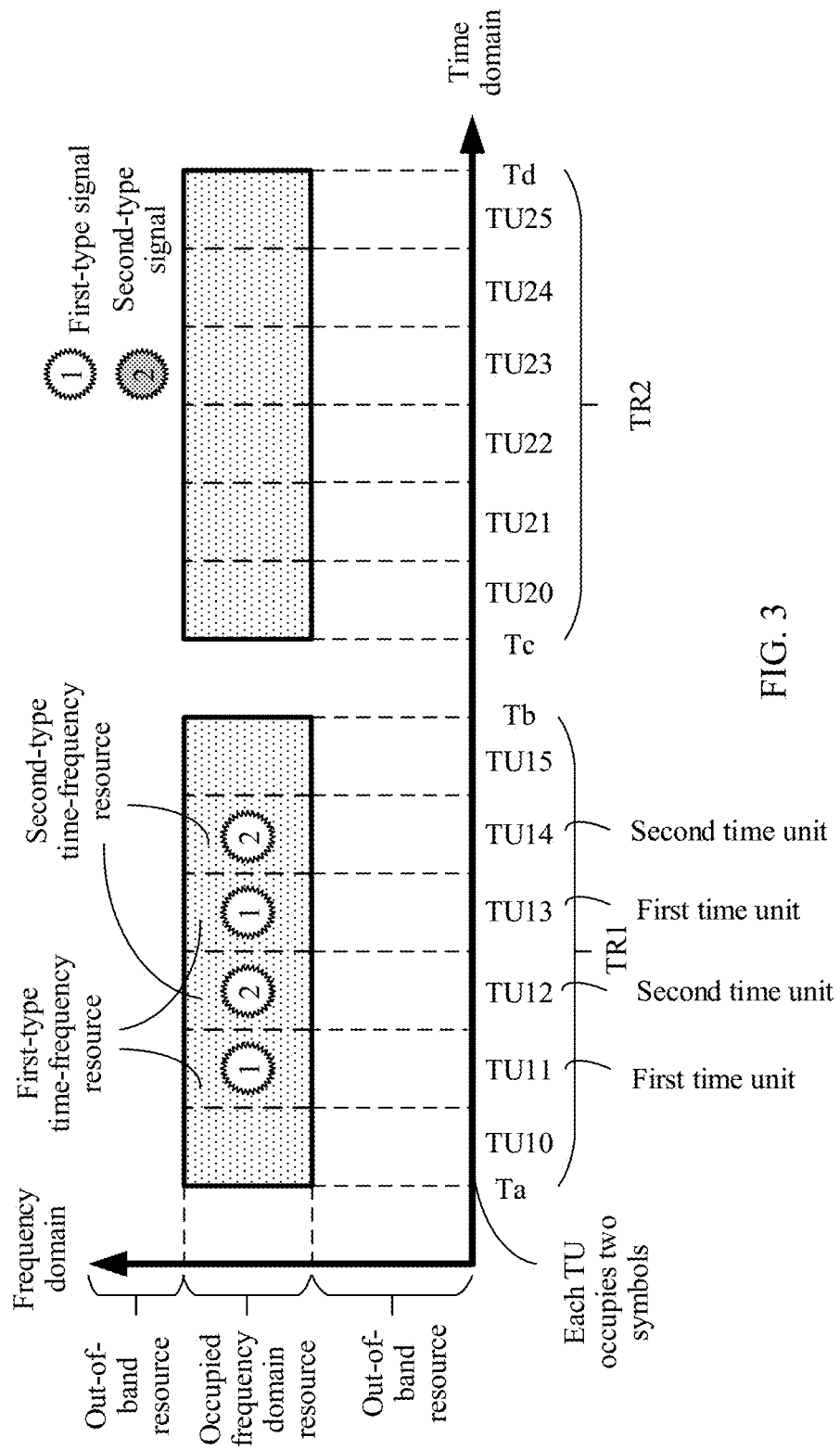
FIG. 3 is a simplified schematic diagram of a time domain structure.

In this application, time intervals may be periodically distributed all the time or in a specific time range. The specific time range may be agreed on in advance, or may be dynamically configured. For example, after a network is set up, time intervals are periodically distributed in time domain all the time based on a specific rule. Time intervals may be continuous or discontinuous in time domain. FIG. 3 is a simplified schematic diagram of a time domain structure. For brevity, FIG. 3 shows two time intervals: a TR1 and a TR2. A start time of the TR1 is Ta, and an end time of the TR1 is Tb; a start time of the TR2 is Tc, and an end time of the TR2 is Td. The TR1 and the TR2 are discontinuous in time domain. Optionally, the start time of the TR2 may alternatively be Tb, and in this case, the TR1 and the TR2 are continuous in time domain. The start time may also be referred to as a start location, and the end time may also be referred to as an end location. Duration may also be referred to as a length. A time interval may be expressed by using a start time and duration, may be expressed by using a start time and an end time, or may be expressed by using an end time and duration. In an optional design, a specific time range may be divided into continuous time intervals, and structures of the time intervals are the same. For example, a plurality of time intervals similar to the TR1 may be included in time domain.

In this application, a time interval may include several time units, and duration of the time units are the same. Different time units may be continuous or discontinuous in time domain. Time domain structures of different time intervals are the same. As shown in FIG. 3, the TR1 and the TR2 each include six continuous time units with same duration in time domain, the TR1 includes a TU10, a TU11, . . . , and a TU15, and the TR2 includes a TU20, a TU21, . . . , and a TU25. A start time of a $1^{st}$ time unit in a time area may be later than a start time of the time area. For example, a start time of the TU10 may be later than Ta. An end time of a last time unit in a time area may be earlier than an end time of the time area. For example, an end time of the TU15 may be earlier than Td. In an optional design, a time interval may be divided into continuous time units, a start time of a $1^{st}$ time unit in the time interval is equal to a start time of the time interval, and an end time of a last time unit in the time interval is equal to an end time of the time interval. Generally, a location of a time unit refers to distribution of the time unit in time domain. The location of the time unit may be expressed in different manners based on different time measurement units. For example, a location of the TU13 is a fourth time unit in the TR1 or a seventh symbol and an eighth symbol in the TR1. The time measurement unit may be a transmission time interval (TTI), a symbol, a timeslot, a mini-slot, a subframe, a second, a millisecond, a microsecond, or the like. The time measurement unit is sometimes briefly referred to as a measurement unit. In this application, duration may be expressed in different manners based on different measurement units. For example, duration is 1 second, or the duration is 10 symbols.

In this application, a signal may be transmitted in unit of a time unit. For example, different first-type signals may be transmitted in a time unit, and different first-type signals may be transmitted in different time units. For example, the TU11 may be used for one transmission of a primary synchronization signal, and the TU13 may be used for one transmission of a broadcast channel signal. For another example, the TU11 may be used to transmit a primary synchronization signal sent by using a beam B1, and the TU12 may be used to transmit a primary synchronization signal sent by using a beam B2. A time unit for transmitting a first-type signal may be referred to as a first time unit. For another example, different second-type signals may be transmitted in a time unit, and different second-type signals may be transmitted in different time units. A time unit for transmitting a second-type signal may be referred to as a second time unit. For example, in the TR1, the TU11 and the TU13 are used to transmit first-type signals, and the TU12 and the TU14 are used to transmit second-type signals. In this case, the TU12 and the TU14 may be referred to as second time units.

In this application, a quantity of first time units in a time interval is associated with a quantity of first-type signals transmitted in the time interval. For example, in a time interval, one transmission of a synchronization signal needs to be performed by using B1, and one transmission of a synchronization signal needs to be performed by using B2. In this case, it may be considered that two first-type signals need to be transmitted in the time interval. If one first time unit is used to transmit one first-type signal, two first time units are required in the time interval. For another example, four first-type signals need to be sent in a time interval, and each first time unit may be used to send two first-type signals. In this case, two first time units are required in the time interval.

In this application, a start time and an end time may sometimes be expressed by using a start location and an end location, and meanings of the two are equivalent. A start location of a second time unit is a location of a $1^{st}$ second time unit in one or more second time units in time domain, and an end location of the second time unit is a location of a last second time unit in the one or more second time units in time domain. A start location of a first time unit is a location of a $1^{st}$ first time unit in one or more first time units in time domain, and an end location of the first time unit is a location of a last first time unit in the one or more first time units in time domain. A start location of a time interval is a start location of the time interval in time domain, and an end location of the time interval is an end location of the time interval in time domain. Persons skilled in the art should know that learning of a location of a time unit is equivalent to learning of a start location or an end location of the time unit in time domain.

In this application, a time-frequency resource used to transmit a first-type signal is referred to as a first-type time-frequency resource, and a time-frequency resource used to transmit a second-type signal is referred to as a second-type time-frequency resource. In a time interval, a time domain resource of the first-type time-frequency resource is a first time unit included in the time interval, and a time domain resource of the second-type time-frequency resource is a second time unit included in the time interval. For example, a time interval includes 10 time units: four first time units and six second time units. In this case, the four first time units are time domain resources of the first-type time-frequency resource, and the six second time units are time domain resources of the second-type time-frequency resource. As shown in FIG. 3, time domain resources of the first-type time-frequency resource are the TU11 and the TU13, and time domain resources of the second-type time-frequency resource are the TU12 and the TU14. A location and a size of a frequency domain resource of the first-type time-frequency resource may be agreed on in advance, or may be configured by a sending node for a receiving node. A location and a size of a frequency domain resource of the second-type time-frequency resource may be agreed on in advance, or may be configured by a sending node for a receiving node. Optionally, the location and the size of the frequency domain resource of the first-type time-frequency resource are the same as those of the frequency domain resource of the second-type time-frequency resource. A frequency domain resource other than the frequency domain resource of the first-type time-frequency resource or other than the frequency domain resource of the second-type time-frequency resource may be referred to as an out-of-band resource.

In this application, duration of a synchronization signal block may be duration of a time unit. In a time interval, one or more synchronization signal blocks may be used as first-type time-frequency resources to transmit first-type signals, and one or more synchronization signal blocks may be used as second-type time-frequency resources to transmit second-type signals.

In this application, a synchronization signal pulse may include a plurality of synchronization signal blocks. The plurality of synchronization signal blocks may be continuous or discontinuous in time domain. Optionally, duration of a synchronization signal pulse may be duration of a time interval. Optionally, duration of a synchronization signal pulse may be a sum of duration of time units in a time interval that are used to transmit first-type signals.

In this application, a synchronization signal pulse set may include a plurality of synchronization signal pulses. The plurality of synchronization signal pulses may be continuous or discontinuous in time domain. Optionally, duration of a synchronization signal pulse set may be duration of a time interval. Optionally, duration of a synchronization signal pulse set may be a sum of duration of time units in a time interval that are used to transmit first-type signals.

In this application, an in-advance agreement is a matter that a receiving node and a sending node can know without interaction, for example, an in-advance agreement in a communications standard (such as a communications standard of the 3rd Generation Partnership Project 3GPP). Sometimes, "in-advance" may also be expressed as "beforehand".

In this application, a quantity of first time units in a time interval may be briefly referred to as a quantity of first time units, and a quantity of second time units in a time interval may be briefly referred to as a quantity of second time units.

A transmission method according to an embodiment of this application may be used in a wireless communications system shown in FIG. 1. As shown in FIG. 1, the wireless communications system includes a base station B200 and a terminal T100. The base station B200 may communicate with the terminal T100 by using different space resources (such as B1 or B2). For example, the base station B200 may send first-type signals to the terminal T100 by using different space resources. The wireless communications system may be a 4G communications system such as an LTE (long term evolution) system, a 5G communications system such as an NR (new radio, new air) system, or a communications system integrating a plurality of communications technologies (for example, a communications system integrating an LTE technology and an NR technology). For a time domain structure corresponding to the wireless communications system, refer to the time domain structure in FIG. 3. In the method, the base station B200 may be considered as a sending node, and the terminal T100 may be considered as a receiving node. Devices specifically indicated by the sending node and the receiving node may vary with different networks or application scenarios.

The terminal T100 is a device that has a wireless communication function, and may be a handheld device that has a wireless communication function, an in-vehicle device, a wearable device, a computing device, another processing device connected to a wireless modem, or the like. The terminal may have different names in different networks, such as user equipment, a mobile station, a subscriber unit, a station, a cellular phone, a personal digital assistant, a wireless modem, a wireless communications device, a handheld device, a laptop computer, a cordless telephone set, or a wireless local loop station.

Figure 4:
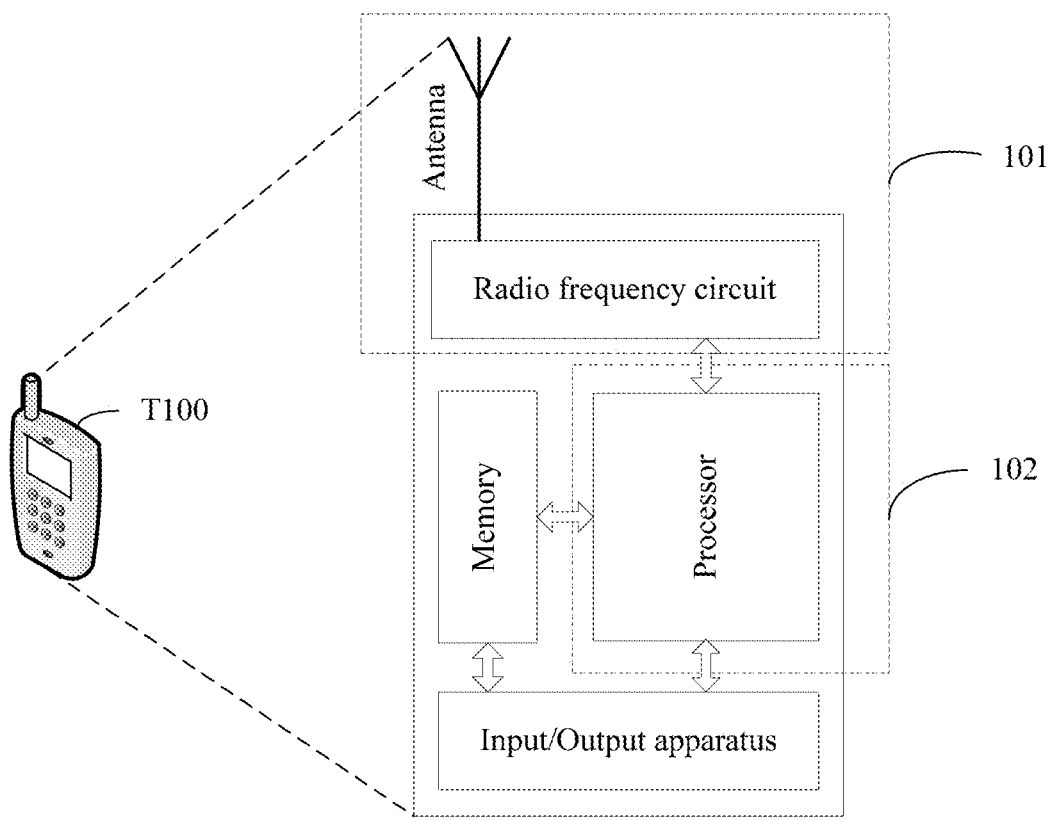
FIG. 4 is a simplified schematic diagram of a structure of a terminal.

A schematic structural diagram of the terminal T100 may be shown in FIG. 4. For ease of description, FIG. 4 shows merely main components of the terminal. As shown in FIG. 4, the terminal T100 includes a processor, a memory, a radio frequency circuit, an antenna, and an input/output apparatus. The processor is mainly configured to: process a communications protocol and communications data, control entire user equipment, execute a software program, and process data of the software program. The memory is mainly configured to store the software program and the data. The radio frequency circuit is mainly configured to: perform conversion between a baseband signal and a radio frequency signal, and process the radio frequency signal. The antenna is mainly configured to receive and transmit a radio frequency signal in an electromagnetic wave form. The input/output apparatus, such as a touchscreen, a display screen, or a keyboard, is mainly configured to: receive data entered by a user and output data to the user. Some types of terminals do not have an input/output apparatus.

After the terminal is powered on, the processor may read the software program in the storage unit, interpret and execute an instruction of the software program, and process the data of the software program. When data needs to be sent wirelessly, the processor performs baseband processing on the to-be-sent data, and then outputs a baseband signal to the radio frequency circuit. The radio frequency circuit performs radio frequency processing on the baseband signal, and then sends a radio frequency signal in an electromagnetic wave form by using the antenna. When data is sent to the user equipment, the radio frequency circuit receives a radio frequency signal by using the antenna, converts the radio frequency signal into a baseband signal, and outputs the baseband signal to the processor. The processor converts the baseband signal into data and processes the data.

Persons skilled in the art may understand that, for ease of description, FIG. 4 shows merely one memory and one processor. In actual user equipment, there may be a plurality of processors and memories. The memory may also be referred to as a storage medium, a storage device, or the like. This is not limited in this embodiment of this application.

In an optional implementation, the processor may include a baseband processor and a central processing unit. The baseband processor is mainly configured to process the communications protocol and the communications data. The central processing unit is mainly configured to: control the entire user equipment, execute the software program, and process the data of the software program. Functions of the baseband processor and the central processing unit are integrated into the processor in FIG. 4. Persons skilled in the art may understand that, the baseband processor and the central processing unit may alternatively be independent processors, and may be connected by using a bus or other technologies. Persons skilled in the art may understand that the terminal may include a plurality of baseband processors to adapt to different network standards. Persons skilled in the art may understand that the terminal may include a plurality of central processing units to enhance a processing capability of the terminal.

Persons skilled in the art may understand that various components of the terminal may be connected by using various buses.

Persons skilled in the art may understand that the baseband processor may also be expressed as a baseband processing circuit or a baseband processing chip.

Persons skilled in the art may understand that the central processing unit may also be expressed as a central processing circuit or a central processing chip.

Persons skilled in the art may understand that, a function of processing the communications protocol and the communications data may be embedded in the processor; or may be stored in the storage unit in a form of a software program, and the processor executes the software program to implement a baseband processing function.

For example, in this embodiment of this application, the antenna that has a receiving and sending function and the radio frequency circuit may be considered as a transceiver unit of the terminal, and the processor that has a processing function may be considered as a processing unit of the terminal. As shown in FIG. 4, the terminal T100 includes a transceiver unit 101 and a processing unit 102. The transceiver unit may also be referred to as a transceiver, a transceiver, a transceiver apparatus, or the like. The processing unit may also be referred to as a processor, a processing board, a processing module, a processing apparatus, or the like. Optionally, a component that is in the transceiver unit 101 and that is configured to implement a receiving function may be considered as a receiving unit, and a component that is in the transceiver unit 101 and that is configured to implement a sending function may be considered as a sending unit. In other words, the transceiver unit 101 includes the receiving unit and the sending unit. For example, the receiving unit may also be referred to as a receiver, a receiver, a receive circuit, or the like, and the sending unit may be referred to as a transmitter, a transmitter, a transmit circuit, or the like.

Figure 5:
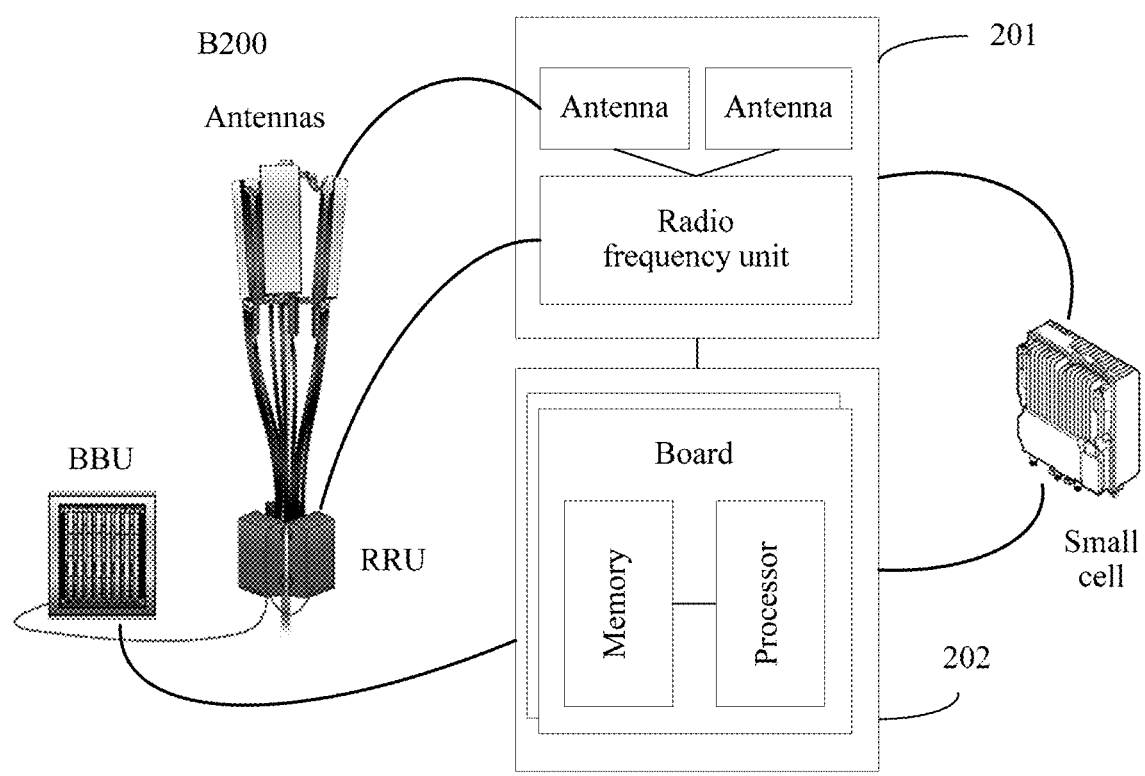
FIG. 5 is a simplified schematic diagram of a structure of a base station.

The base station B200 may also be referred to as a base station device, and is a device that is deployed in a radio access network to provide a wireless communication function. For example, a base station in an LTE network is referred to as an evolved NodeB (eNB or eNodeB), and a base station in an NR network is referred to as a TRP (transmission reception point) or a gNB (generation NodeB, next generation NodeB). A structure of the base station B200 is shown in FIG. 5. The base station B200 shown in FIG. 5 may be a separated base station. For example, a distributed base station that includes antennas, a remote radio unit (RRU), and a baseband unit (BBU) is shown on the left of FIG. 5. Alternatively, the base station shown in FIG. 5 may be an integrated base station, such as a small cell shown on the right of FIG. 5. Generally, the base station includes a part 201 and a part 202. The part 201 is mainly configured to: receive and transmit radio frequency signals, and perform conversion between a radio frequency signal and a baseband signal. The part 202 is mainly configured to: perform baseband processing, control the base station, and the like. The part 201 may usually be referred to as a transceiver unit, a transceiver, a transceiver circuit, a transceiver, or the like. The part 202 may usually be referred to as a processing unit. The part 202 is usually a control center of the base station.

As shown in FIG. 5, in an optional implementation, the part 201 may include an antenna and a radio frequency unit. The radio frequency unit is mainly configured to perform radio frequency processing. Optionally, in the part 201, a component configured to implement a receiving function may be considered as a receiving unit, and a component configured to implement a sending function may be considered as a sending unit. In other words, the part 201 includes the receiving unit and the sending unit. For example, the receiving unit may also be referred to as a receiver, a receiver, a receive circuit, or the like, and the sending unit may be referred to as a transmitter, a transmitter, a transmit circuit, or the like.

As shown in FIG. 5, in an optional implementation, the part 202 may include one or more boards. Each board may include a processor and a memory. The processor is configured to read and execute a program in the memory, to implement a baseband processing function and control the base station. If there are a plurality of boards, the boards may be interconnected to enhance a processing capability.

In another optional implementation, as system-on-chip (SoC for short) technologies develop, functions of the part 202 and the part 201 may be implemented by using the SoC technologies, that is, implemented by using a base station function chip. Components such as a processor, a memory, and an antenna are integrated into the base station function chip. The memory stores a program of a related function of the base station, and the processor executes the program to implement the related function of the base station.

Figure 6:
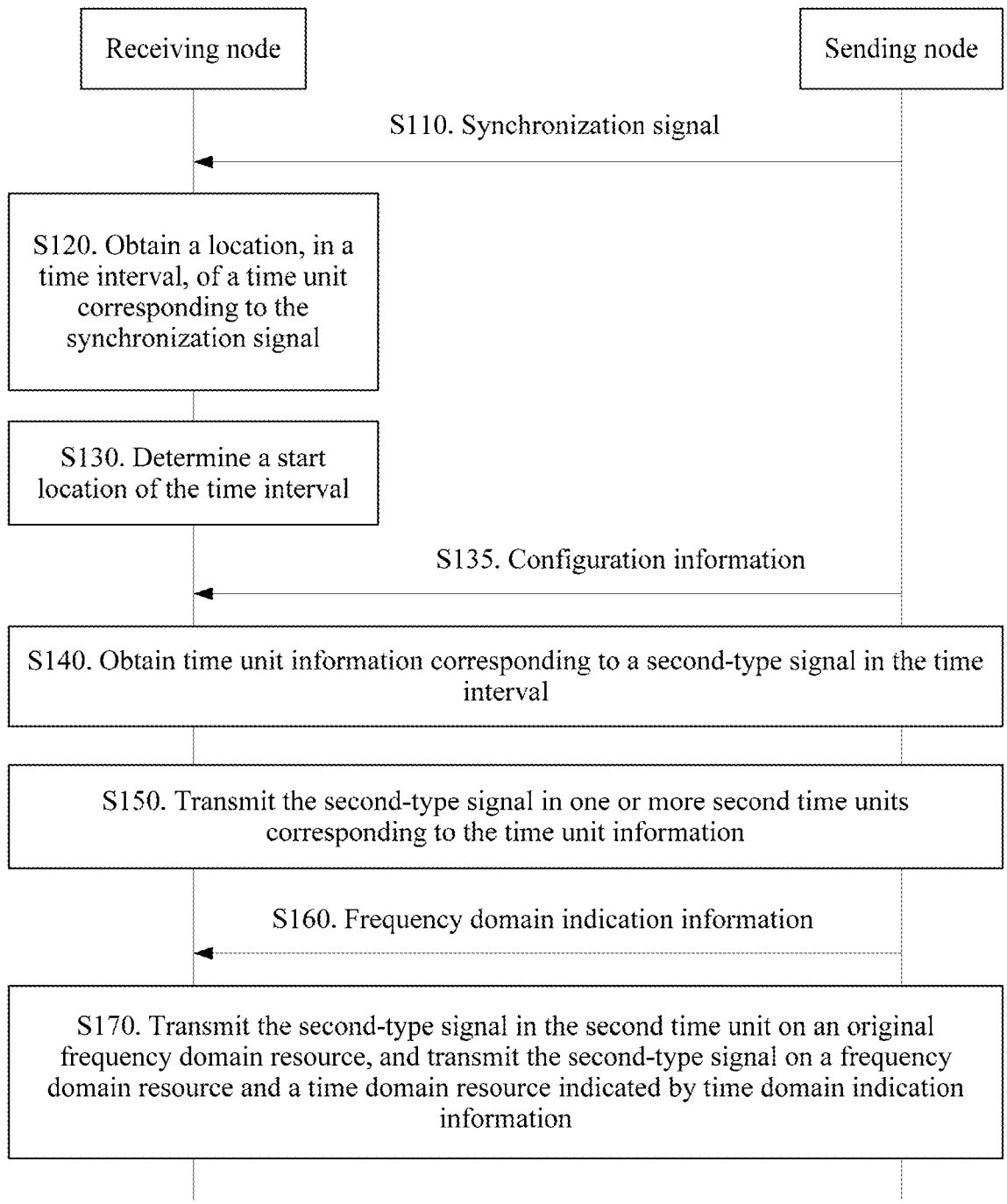
FIG. 6 is a schematic flowchart of a communication method.

The following describes a communication method according to an embodiment of this application with reference to the terminal T100 and the base station B200. FIG. 6 shows a transmission method according to an embodiment of this application. For a structure of a sending node in FIG. 6, refer to a structure of the base station B200. For a structure of a receiving node, refer to a structure of the terminal T100. A related example in FIG. 6 is described with reference to the time domain structure in FIG. 3.

As shown in FIG. 6, the process includes the following steps.

S110. A sending node sends a synchronization signal.

In an optional implementation, a processor 202 of the base station B200 may be configured to send the synchronization signal by using a transceiver 201. A processor 102 of the terminal T100 may be configured to receive the synchronization signal by using a transceiver 101.

S120. A receiving node obtains, based on the synchronization signal, a location, in a time interval, of a time unit corresponding to the synchronization signal.

In an optional implementation, the processor 102 of the terminal T100 may be configured to obtain, based on the synchronization signal, the location, in the time interval, of the time unit corresponding to the synchronization signal.

Figure 7:
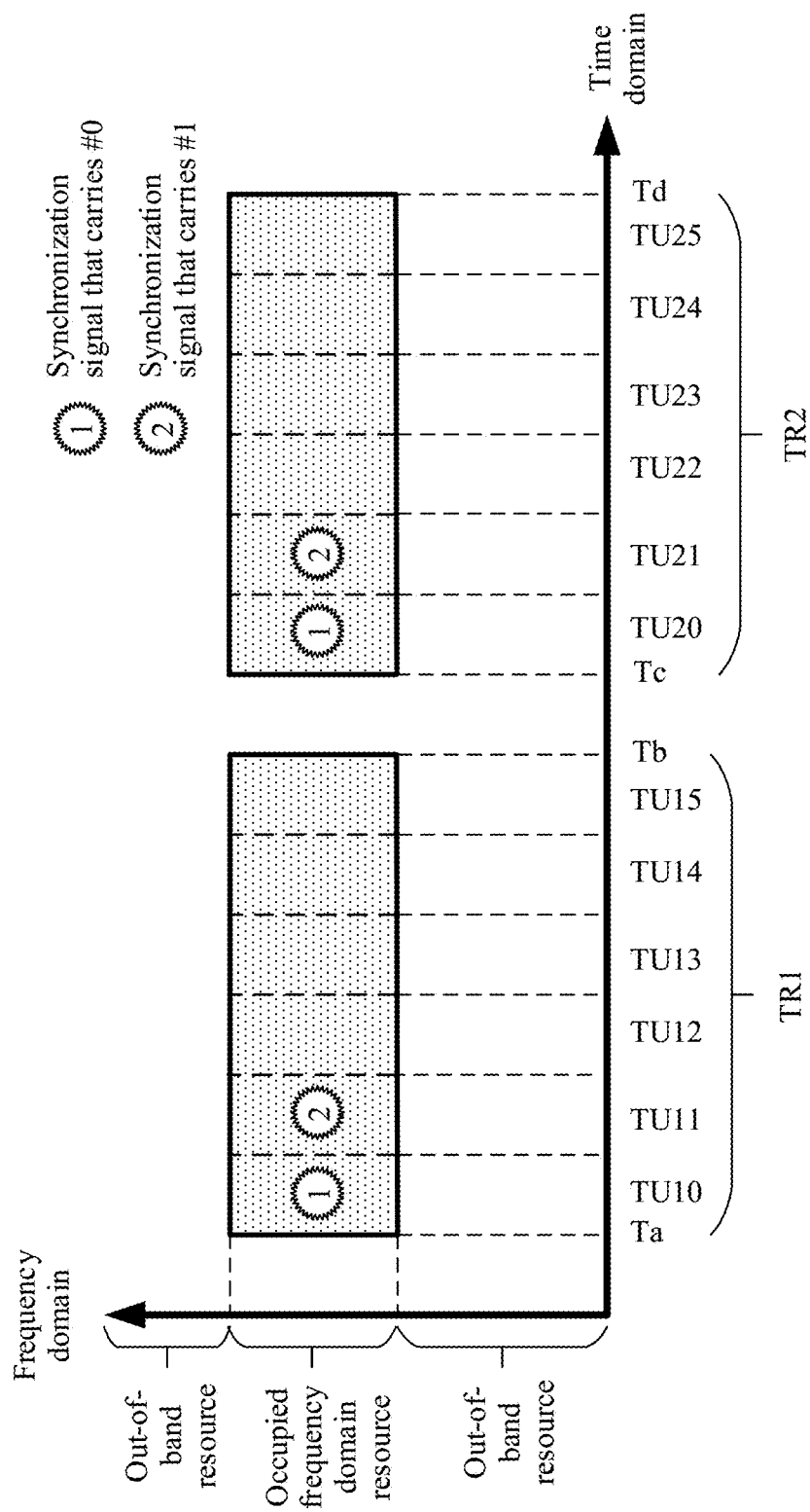
FIG. 7 is a schematic diagram of signal transmission in a time interval.

For example, the sending node periodically sends synchronization signals in a $1^{st}$ time unit and a $2^{nd}$ time unit in each time interval. A synchronization signal in the $1^{st}$ time unit carries an index #0, and a synchronization signal in the $2^{nd}$ time unit carries an index #1. For example, as shown in FIG. 7, a synchronization signal that carries an index #0 is transmitted in a TU10 of a TR1, and a synchronization signal that carries an index #1 is transmitted in a TU11 of the TR1; and a synchronization signal that carries an index #0 is transmitted in a TU20 of a TR2, and a synchronization signal that carries an index #1 is transmitted in a TU21 of the TR2.

For example, if a synchronization signal received by the receiving node carries an index #1, it may be learned that a time unit in which the synchronization signal is located is the $2^{nd}$ time unit in the time interval.

S130. The receiving node determines a start location of the time interval based on the location of the time unit.

In an optional implementation, the processor 102 of the terminal T100 may be configured to determine the start location of the time interval based on the location of the time unit.

The receiving node may learn of a start location of each time interval based on a periodic rule of the time interval.

For example, a receiving node learns that a time unit in which the synchronization signal is located is the $2^{nd}$ time unit in the time interval, and the start location of the time interval may be obtained by shifting one time unit forward. In this way, the receiving node may learn of start locations of a TR0, the TR1, and the TR2.

For another example, the sending node sends a synchronization signal in a TU13 of the TR1, and the receiving node may learn, by using the synchronization signal, that the synchronization signal is in the TU13. In this case, the receiving node may obtain the start location of the TR1 by shifting three time units forward. The TR2 and the TR1 are periodically distributed. Therefore, the receiving node may also learn of the start location of the TR2.

By using the foregoing synchronization action, the receiving node may learn of start locations of different time intervals and start locations of different time units. By using S140 and S150, the receiving node may learn of a location of a second time unit in the time interval, so that a transmission resource in the time interval can be fully utilized, thereby improving transmission efficiency.

S140. The receiving node obtains time unit information corresponding to a second-type signal in the time interval.

In an optional implementation, the processor 102 of the terminal T100 may be configured to obtain the time unit information corresponding to the second-type signal in the time interval.

In S140, the sending node may explicitly or implicitly send the time unit information. In an optional implementation, the processor 202 of the base station B200 may be configured to explicitly or implicitly send the time unit information by using the transceiver 201. The explicitly sending the time unit information is sending the time unit information by carrying an information element, a field, or a bit. The implicitly sending the time unit information is indicating the time unit information by using an attribute of a transmission resource corresponding to a type of information, such as a time domain location or a frequency domain location of the resource. For example, a start location of the second time unit is indicated by using a start location of downlink control information in time domain.

The time unit information may be used to learn of the location of the second time unit in the time interval.

For example, if the location of the second time unit in the time interval is specified by a communications standard, location information of the second time unit may be pre-configured on the receiving node, and the receiving node may locally obtain the time unit information.

For another example, if a communications standard specifies that all time units in the time interval except a first time unit are second time units, locations of the second time units may be learned of based on a location of the first time unit in the time interval. The location of the first time unit in the time interval may be used as the time unit information.

Optionally, the method may further include S135: The sending node sends configuration information to the receiving node. In an optional implementation, the processor 202 of the base station B200 may be configured to send the configuration information to the terminal T100 by using the transceiver 201. The processor 102 of the terminal T100 may be configured to receive the configuration information by using the transceiver 101. The receiving node may learn of the location of the second time unit in the time interval by using the time unit information in combination with the configuration information. Optionally, the configuration information may be predetermined.

S150. The receiving node and the sending node transmit the second-type signal in one or more second time units corresponding to the time unit information, that is, transmit the second-type signal on a second-type time-frequency resource.

In an optional implementation, the processor 202 of the base station B200 may be configured to transmit, by using the transceiver 201, the second-type signal with the terminal T100 in the one or more second time units corresponding to the time unit information. The processor 102 of the terminal T100 may be configured to transmit, by using the transceiver 101, the second-type signal with the base station B200 in the one or more second time units corresponding to the time unit information.

The second time unit in the time interval may be obtained by using the time unit information. Therefore, it is considered that there is a correspondence between the time unit information and the second time unit.

For example, the receiving node may transmit the second-type signal based on a stipulation of a communications standard. For example, a control channel signal may be transmitted in a 1$^{st}$ second time unit, and a data channel signal may be transmitted in a subsequent second time unit.

Figure 8:
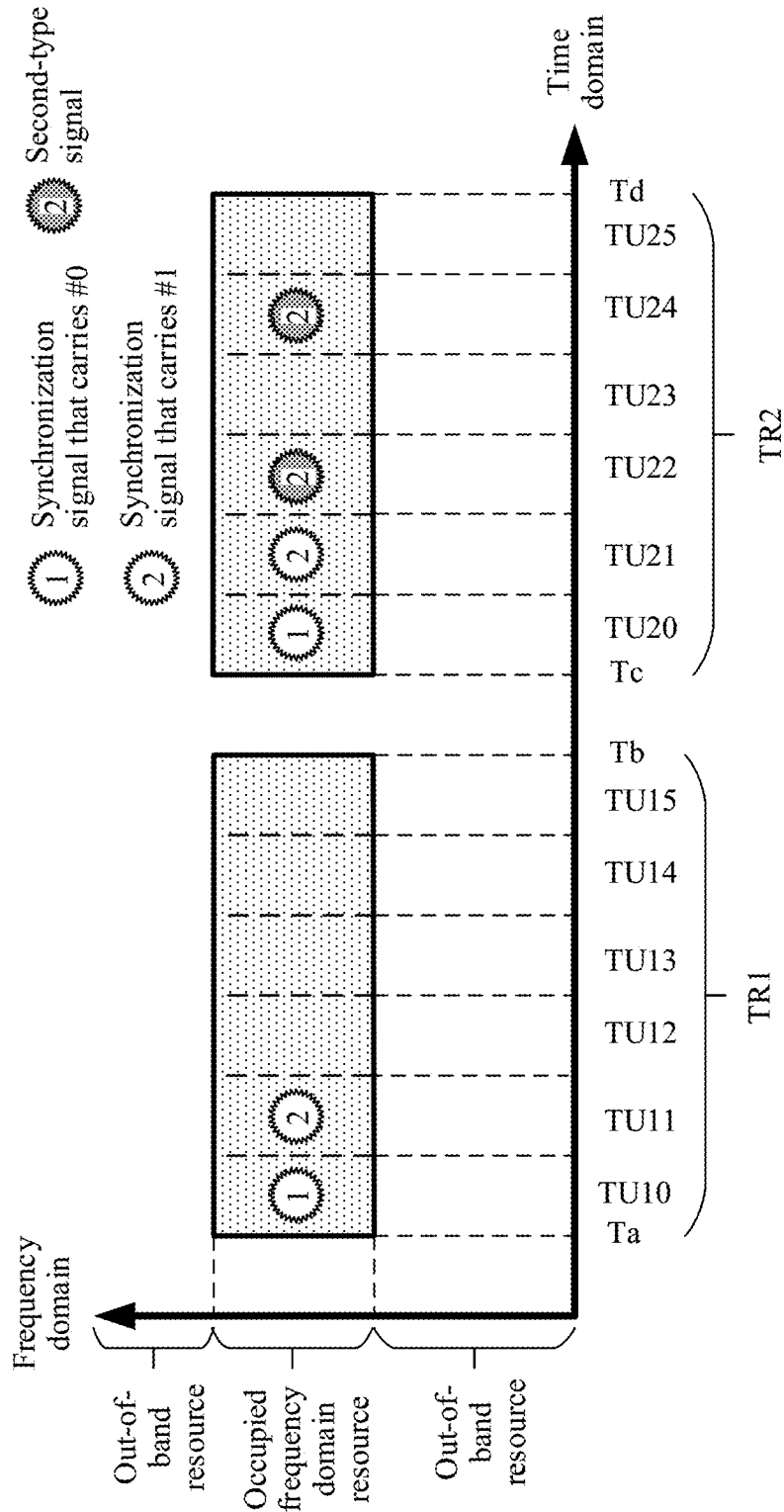
FIG. 8 is another schematic diagram of signal transmission in a time interval.

For example, as shown in FIG. 8, the time interval is a TR2, and the time unit information indicates a TU22 and a TU24. The receiving node receives the second-type signal in the TU22 and the TU24.

By using S140 and S150, transmission of a first-type signal and the second-type signal in the time interval may be dynamically planned, to help improve transmission efficiency.

In the following steps, the second-type signal may be transmitted on a frequency domain resource other than an original frequency domain resource that is used to transmit the first-type signal or the second-type signal, to further improve transmission efficiency. The frequency domain resource other than the original frequency domain resource used for the first-type signal and the second-type signal may be referred to as an out-of-band resource.

S160. The sending node sends frequency domain indication information to the receiving node.

In an optional implementation, the processor 202 of the base station B200 may be configured to send the frequency domain indication information to the receiving node by using the transceiver 201. The processor 102 of the terminal T100 may be configured to receive the frequency domain indication information by using the transceiver 101.

Optionally, the frequency domain indication information is used to instruct to transmit the second-type signal in the second time unit by using an out-of-band resource.

Optionally, the frequency domain indication information is used to instruct to transmit the second-type signal in the first time unit by using an out-of-band resource.

Optionally, the frequency domain indication information is used to instruct to transmit the second-type signal in the first time unit and the second time unit by using an out-of-band resource.

Optionally, the frequency domain indication information is used to instruct to transmit the second-type signal by using an out-of-band resource. That the second-type signal is transmitted by using an out-of-band resource in the first time unit, the second time unit, the first time unit and the second time unit, or the entire time interval can be agreed on in advance.

Optionally, a location of the out-of-band resource in frequency domain may be used as the frequency domain indication information or a part of the frequency domain indication information.

S170. The receiving node and the sending node transmit the second-type signal in the second time unit on an original frequency domain resource, and transmit the second-type signal on a frequency domain resource and a time domain resource indicated by time domain indication information.

In an optional implementation, the processor 202 of the base station B200 may be configured to: transmit the second-type signal with the terminal T100 in the second time unit on the original frequency domain resource by using the transceiver 201, and transmit the second-type signal on the frequency domain resource and the time domain resource indicated by the time domain indication information. The processor 102 of the terminal T100 may be configured to: transmit the second-type signal with the base station B200 in the second time unit on the original frequency domain resource by using the transceiver 101, and transmit the second-type signal on the frequency domain resource and the time domain resource indicated by the time domain indication information.

Optionally, the sending node may send the first-type signal in the first time unit.

Optionally, the sending node that sends the frequency domain indication information and the sending node that transmits the second-type signal with the receiving node may be different nodes or a same node.

Figure 9:
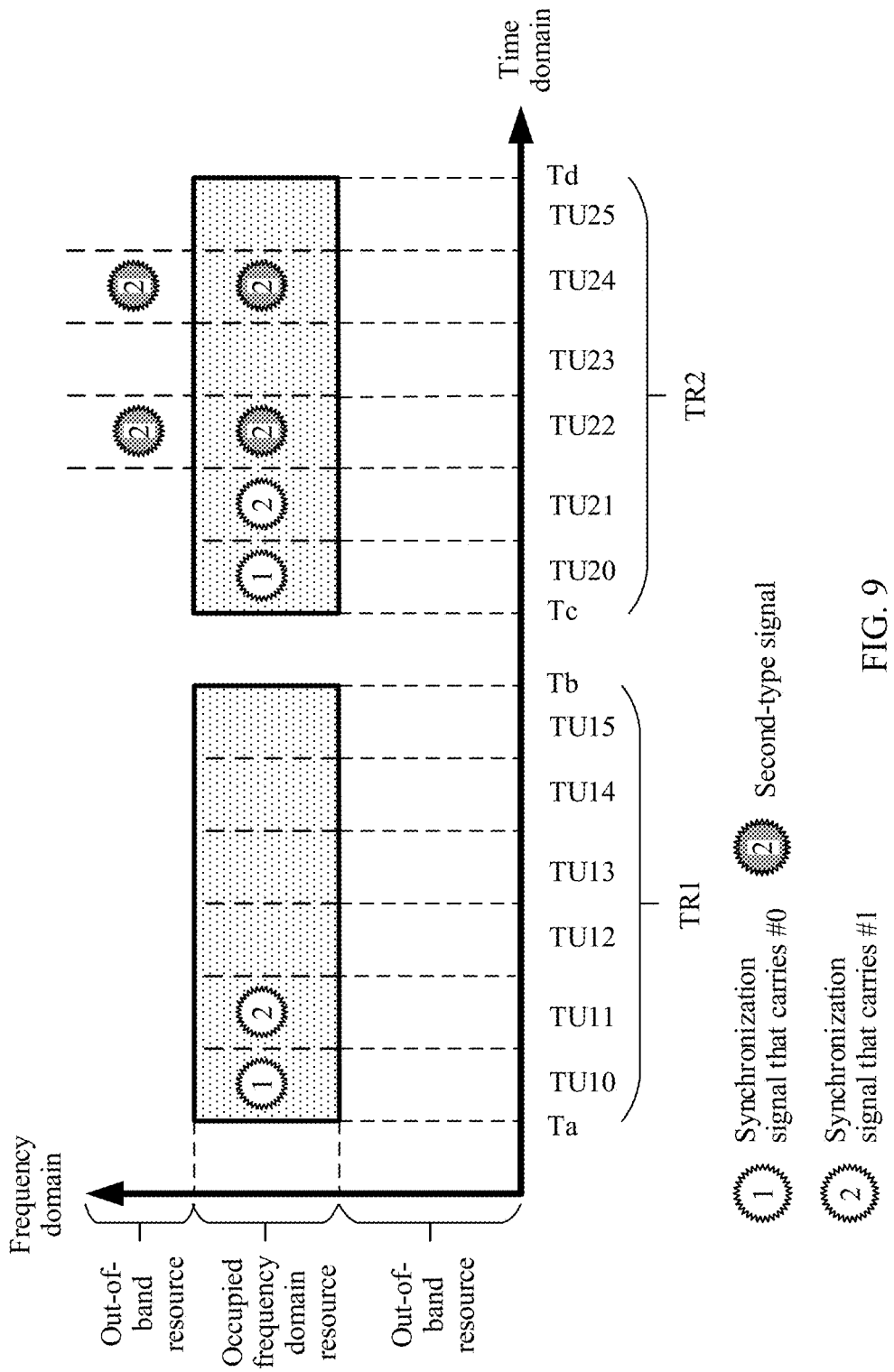
FIG. 9 is another schematic diagram of signal transmission in a time interval.

For example, as shown in FIG. 9, when the second-type signal is not transmitted in the first time unit by using the out-of-band resource, the sending node may perform power boosting on transmission of the first-type signal, to increase power, thereby extending a coverage area of the first-type signal. Transmission efficiency can be improved when the second-type signal is transmitted by using the out-of-band resource.

The one or more second time units corresponding to the time unit information are one or more second time units that can be directly or indirectly determined by using the time unit information. In other words, the time unit information is information that can be used to directly or indirectly determine the one or more second time units. The time unit information may be agreed on in advance, may be received from the sending node, or may be detected by the receiving node.

In a first optional design, an index of the second time unit may be used as the time unit information or a part of the time unit information. The location of the second time unit in the time interval may be learned of by using the index. The index may also be referred to as a serial number or an identifier. Optionally, the index may be an index in unit of a time unit. For example, the indexes may be 2 and 4, indicating that time units whose indexes are 2 and 4 in a time interval are second time units. For example, a TU12 and a TU14 of a TR1 are second time units. For another example, a TU22 and a TU24 of a TR2 are second time units. Optionally, the index may be an index in unit of a symbol. For example, each time unit occupies two symbols. In this case, the indexes may be 4 and 8, indicating that a time unit occupying symbols whose indexes are 4 and 8 in a time interval is a second time unit. For example, if time units occupying symbols whose indexes are 4 and 8 in the TR1 are a TU12 and a TU14, the TU12 and the TU14 are second time units. For another example, if time units occupying symbols whose indexes are 4 and 8 in the TR2 are a TU22 and a TU24, the TU22 and the TU24 are second time units. Optionally, the index may be an index in unit of another time measurement unit, for example, an index in unit of a timeslot or an index in unit of a mini-slot. This is not enumerated herein. The location of the second time unit may be directly determined by using the time unit information, and therefore implementation is relatively simple. In the design, the time unit information may be sent by the sending node to the receiving node. Persons skilled in the art should know that the index of the second time unit embodies a quantity of second time units in the time interval and a distribution rule of the second time unit.

In a second optional design, a bitmap of the second time unit may be used as the time unit information or a part of the time unit information. The bitmap may be used to learn which time units are second time units. Optionally, each bit in the bitmap represents one time unit. For example, the bitmap is 001010, and 1 is used to indicate a second time unit. In this case, 001010 indicates that a third time unit and a fifth time unit in a time interval are second time units. For example, a TU12 and a TU14 of a TR1 are second time units, and a TU22 and a TU24 of a TR2 are second time units. Optionally, the bitmap may be an index in unit of a symbol. For example, the bitmap may be 000011001100, indicating that a time unit occupying symbols 4 and 5 and a time unit occupying symbols 8 and 9 are second time units. For example, the TU12 and the TU14 of the TR1 are second time units, and the TU22 and the TU24 of the TR2 are second time units. In the foregoing example, a time unit is considered as a second time unit when two bits corresponding to two symbols occupied by the time unit are both 1. Optionally, a time unit may be considered as a second time unit when any quantity of bits in a plurality of bits corresponding to a plurality of symbols occupied by the time unit is 1. In the bitmap, whether 0 or 1 is used to indicate the second time unit may be agreed on depending on a requirement. Optionally, the bitmap may be a bitmap in unit of another time measurement unit, for example, a bitmap in unit of a timeslot or a bitmap in unit of a mini-slot. This is not enumerated herein. The location of the second time unit may be directly determined by using the time unit information, and therefore implementation is relatively simple. In the design, the time unit information may be sent by the sending node to the receiving node. Persons skilled in the art should know that the bitmap of the second time unit embodies a quantity of second time units in the time interval, a distribution rule of the second time unit, and a total quantity of time units in one time interval.

In a third optional design, a second time unit indicator may be used as the time unit information or a part of the time unit information. In the design, the receiving node stores a plurality of time domain configurations of the second time unit. The time domain configuration may be used to learn which time units are second time units. A representation form of the time domain configuration may be an index of the second time unit, a bitmap of the second time unit, or other information that can be used to obtain the location of the second time unit. The bitmap is used as an example. The receiving node stores a plurality of pieces of bitmap information, as listed in Table 1. After receiving the second time unit indicator, the receiving node may obtain a time domain configuration, of a second time domain, corresponding to the second time unit indicator, that is, may learn of the location of the second time unit. For example, when receiving a second time unit indicator 1, the receiving node obtains 110011000011, and may learn that a first, a third, and a sixth time units are second time units, for example, a TU10, a TU12, and a TU15 of a TR1, and for another example, a TU20, a TU22, and a TU25 of a TR2.

TABLE 1

| Second time unit indicator | Bitmap |
| --- | --- |
| 0 | 000011001100 |
| 1 | 110011000011 |
| 2 | 001100001111 |
| 3 | 000011111100 |

The plurality of time domain configurations of the second time unit that are stored on the receiving node may be agreed on in advance, or may be sent by the sending node to the receiving node in advance. The time domain configuration of the second time unit may be used as the configuration information or a part of the configuration information. In the design, the time unit information may be sent by the sending node to the receiving node. The time domain configuration of the second time unit is stored on the receiving node, and the second time unit indicator is used to indicate the corresponding time domain configuration of the second time unit, so that consumption of air interface resources of the receiving node and the sending node can be reduced, and the location of the second time unit can be directly determined. Implementation is relatively simple.

In a fourth optional design, a quantity of second time units may be used as the time unit information or a part of the time unit information. The location of the second time unit may be learned of by using the quantity of second time units, a total quantity of time units included in a time interval, and a distribution rule of the second time unit. For example, if a total quantity of time units included in a TR1 is 6, a quantity of second time units is 2, and a distribution rule of the second time unit is that the second time units need to be located at an end of the time interval, the receiving node may learn that a TU14 and a TU15 are the second time units; or if a distribution rule is that the second time units need to be located at an end of the time interval and that any two of the second time units need to be separated by one time unit, the receiving node may learn that a TU15 and a TU13 are the second time units. The distribution rule of the second time unit may be formulated depending on an actual case. This is not limited in this embodiment of this application. The total quantity of time units included in the time interval may be sent by the sending node to the receiving node in advance, or may be agreed on in advance. The total quantity of time units included in the time interval may be used as the configuration information or a part of the configuration information. The distribution rule of the second time unit may be sent by the sending node to the receiving node in advance, or may be agreed on in advance. The distribution rule of the second time unit may be used as the configuration information or a part of the configuration information.

Optionally, in this application, a total quantity of time units included in a time interval may be obtained by using duration of the time interval and duration of a time unit. That "the location of the second time unit may be learned of by using the quantity of second time units, a total quantity of time units included in a time interval, and a distribution rule of the second time unit" may be equivalent to "the location of the second time unit may be learned of by using the quantity of second time units, duration of a time interval, duration of a time unit, and the distribution rule of the second time unit". Different time measurement units may be used for duration. For example, duration of a time interval is 14 symbols, and duration of a time unit is two symbols; in this case, a total quantity of time units included in the time interval is 7. For another example, duration of a time interval is four mini-slots, and duration of a time unit is one mini-slot; in this case, a total quantity of time units included in the time interval is 4. In this manner, the time units are continuous in time domain. In another case, time units are discontinuous in time domain. Information used to obtain a total quantity of time units included in a time interval may be duration of the time interval, duration of the time unit, and duration of an interval between the time units. For example, duration of a time interval is 14 symbols, duration of a time unit is two symbols, and duration of an interval between time units is one symbol; in this case, a total quantity of included time units is 5. The duration of the time interval may be agreed on in advance, or may be sent by the sending node to the receiving node. The duration of the time interval may be used as the configuration information or a part of the configuration information. The duration of the time unit may be agreed on in advance, or may be sent by the sending node to the receiving node. The duration of the time unit may be used as the configuration information or a part of the configuration information. The duration of the interval between time units may be agreed on in advance, or may be sent by the sending node to the receiving node. The duration of the interval between time units may be used as the configuration information or a part of the configuration information.

In a fifth optional design, information used to indicate a quantity of first time units in a time interval may be used as the time unit information or a part of the time unit information.

In a first optional manner, the information used to indicate the quantity of first time units in the time interval may be the quantity of first time units in the time interval.

Optionally, a quantity of second time units may be obtained by using the quantity of first time units, a total quantity of time units included in a time interval, and a distribution rule of the second time unit, and a location of the second time unit may be learned of by using the fourth design. A sum of the quantities of first time units and second time units may be less than or equal to the total quantity of time units included in the time interval. For example, a total quantity of time units included in a time interval is 7, a quantity of first time units is 3, and all remaining time units are second time units according to a distribution rule of the second time unit; in this case, a quantity of second time units is 4. For another example, a total quantity of time units included in a time interval is 7, a quantity of first time units is 3, and one time unit needs to be reserved for other purpose according to a distribution rule of a second time unit; in this case, a quantity of second time units is 3. Similar to the foregoing design, the distribution rule of the second time unit may be agreed on in advance, or may be sent by the sending node to the receiving node. The distribution rule of the second time unit may be used as the configuration information or a part of the configuration information. The distribution rule of the second time unit may be formulated depending on a requirement, and is not limited herein. The total quantity of time units included in the time interval may be agreed on in advance, or may be sent by the sending node to the receiving node. The total quantity of time units included in the time interval may be used as the configuration information or a part of the configuration information.

Optionally, a location of a first time unit may be learned of by using the quantity of first time units, a total quantity of time units included in a time interval, and a distribution rule of the first time unit, and a location of a second time unit may be learned of by using the location of the first time unit. For example, there are seven time units in a time interval in total, and locations of first time units are first, third, fifth, and seventh time units. In this case, locations of second time units may be second, fourth, and sixth time units. For how to obtain the location of the first time unit by using the quantity of first time units, the total quantity of time units included in the time interval, and the distribution rule of the first time unit, refer to a method for learning of the location of the second time unit in the fourth optional design. A method for obtaining the location of the first time unit may be correspondingly obtained by respectively replacing the quantity of second time units and the distribution rule of the second time unit in the fourth optional design with the quantity of first time units and the distribution rule of the first time unit. Details are not described herein again. The distribution rule of the first time unit may be formulated depending on a requirement, and is not limited in this embodiment of this application. The distribution rule of the first time unit may be agreed on in advance, may be sent by the sending node to the receiving node, or may be obtained according to the distribution rule of the second time unit. The distribution rule of the first time unit may be used as the configuration information or a part of the configuration information. Persons skilled in the art may know that the distribution rule of the second time unit may also be obtained by using the distribution rule of the first time unit. For example, the distribution rule of the first time unit is that a first half of time units in a time interval are first time units, and in this case, the distribution rule of the second time unit may be that a second half of time units in the time interval are second time units. For another example, the distribution rule of the second time unit is that a first half of time units in a time interval are second time units, and in this case, the distribution rule of the first time unit may be that a second half of time units in the time interval are first time units. The total quantity of time units included in the time interval may be agreed on in advance, or may be sent by the sending node to the receiving node. The total quantity of time units included in the time interval may be used as the configuration information or a part of the configuration information.

In the foregoing example, in the distribution rule of the first time unit or the distribution rule of the second time unit, it may be considered that several time units are reserved for other purpose. For example, there are seven time units in a time interval in total, locations of first time units are first, third, fifth, and seventh time units, and a sixth time unit needs to be reserved for other purpose according to the distribution rule of the second time unit. In other words, the sixth time unit is not used as a second time unit. In this case, locations of second time units may be second and fourth time units.

In a second optional manner, the quantity of first time units in the time interval may be obtained by using a quantity of beams of the sending node and a quantity of beams corresponding to one first time unit. The quantity of beams of the sending node may be a quantity of beams currently used by the sending node, a quantity of beams used by the sending node for the receiving node, or a quantity of beams activated by the sending node. For example, a quantity X of beams of the sending node is 4, and a quantity Y of beams corresponding to one first time unit is 1. In this case, a quantity of first time units in a time interval is $(X/Y) \times N$, where N=1, 2, 3, . . . , (N is a positive integer), and X/Y may be rounded up or down to a nearest integer depending on a requirement when X/Y is a non-integer. N may be agreed on in advance or sent by the sending node to the receiving node, and N may be used as the configuration information or a part of the configuration information. The quantity of beams of the sending node may be agreed on in advance, or may be sent by the sending node to the receiving node. The quantity of beams of the sending node may be used as the configuration information or a part of the configuration information. The quantity of beams corresponding to one first time unit may be agreed on in advance, or may be sent by the sending node to the receiving node. The quantity of beams corresponding to one first time unit may be used as the configuration information or a part of the configuration information. In this manner, the information used to indicate the quantity of first time units in the time interval may be the quantity of beams of the sending node, the quantity of beams corresponding to one first time unit, or the quantity of beams of the sending node and the quantity of beams corresponding to one first time unit.

In a third optional manner, the quantity of first time units in the time interval may be obtained by using a total quantity of first time units in a plurality of time intervals and a quantity of the plurality of time intervals. For example, there are five time intervals, and there are 30 first time units in total; in this case, there are six first time units in one time interval. In the foregoing example, each of the time interval includes a same quantity of first time units. Optionally, quantities of first time units included in the time intervals may be different. For example, a distribution rule of a first time unit is that, a quantity of first time units in a first time interval in a plurality of time intervals is two more than a quantity of first time units in a last time interval. In this case, the quantity of first time units in the first time interval is 7, the quantity of first time units in the last time interval is 5, and a quantity of first time units in each of remaining time intervals is 6. The quantity of the plurality of time intervals may be sent by the sending node to the receiving node, or may be agreed on in advance. The quantity of the plurality of time intervals may be used as the configuration information or a part of the configuration information. The quantity of first time units in the plurality of time intervals may be sent by the sending node to the receiving node, or may be agreed on in advance. The total quantity of first time units in the plurality of time intervals may be used as the configuration information or a part of the configuration information. In this manner, the information used to indicate the quantity of first time units in the time interval may be the quantity of the plurality of time intervals and/or the total quantity of first time units in the plurality of time intervals.

In a sixth optional design, an index of a first time unit may be used as the time unit information or a part of the time unit information.

Optionally, a location of a first time unit in a time interval may be learned of by using the index of the first time unit, and a location of a second time unit in the time interval may be learned of according to a distribution rule of the second time unit. For example, in a TR1, a $1^{st}$ time unit and a $2^{nd}$ time unit are first time units, and all remaining time units are second time units according to the distribution rule of the second time unit. In this case, it may be learned that a TU12, a TU13, a TU14, and a TU15 are second time units. A specific solution for obtaining the location of the first time unit in the time interval by using the index of the first time unit may be obtained by replacing the second time unit in the first optional design with the first time unit. Details are not described herein again.

Optionally, an index of a second time unit may be learned of by using the index of the first time unit and the distribution rule of the second time unit, so that a location of the second time unit in the time interval may be learned of. For example, the indexes of the first time units are 1 and 3, and according to the distribution rule of the second time unit, a $1^{st}$ second time unit needs to be adjacent to a last first time unit, and the time interval needs to be occupied as fully as possible. In this case, it may be learned that the indexes of the second time units are 4 and 5. For a specific solution for obtaining the location of the second time unit in the time interval based on the index of the second time unit, refer to the first optional design.

Similar to the foregoing design, the distribution rule of the second time unit may be sent by the sending node to the receiving node in advance, or may be agreed on in advance. Content of the distribution rule may be formulated depending on an actual case. The distribution rule of the second time unit may be used as the configuration information or a part of the configuration information.

In a seventh optional design, a bitmap of a first time unit may be used as the time unit information or a part of the time unit information.

Optionally, a location of a first time unit in a time interval may be learned of by using the bitmap of the first time unit, and a location of a second time unit in the time interval may be learned of according to a distribution rule of the second time unit. For example, the bitmap of the first time unit is 101000, where 1 is used to indicate the first time unit; and according to the distribution rule of the second time unit, the second time unit occupies the time interval as fully as possible, and needs to be located behind a last first time unit. In this case, locations of second time units may be fourth, fifth, and sixth time units. A specific solution for obtaining the location of the first time unit in the time interval by using the bitmap of the first time unit may be obtained by replacing the second time unit in the second optional design with the first time unit. Details are not described herein again.

Optionally, a bitmap of a second time unit may be learned of by using the bitmap of the first time unit and the distribution rule of the second time unit, so that a location of the second time unit in the time interval may be learned of. For example, the bitmap of the first time unit is 101000, and the second time unit occupies the time interval as fully as possible according to the distribution rule of the second time unit. In this case, the bitmap of the second time unit is 010111, so that it can be learned that locations of second time units are second, fourth, fifth, and sixth time units. For a specific solution for obtaining the location of the second time unit in the time interval based on the bitmap of the second time unit, refer to the second optional design.

Similar to the foregoing design, the distribution rule of the second time unit may be sent by the sending node to the receiving node in advance, or may be agreed on in advance. Content of the distribution rule may be formulated depending on an actual case. The distribution rule of the second time unit may be used as the configuration information or a part of the configuration information.

In an eighth optional design, a first time unit indicator may be used as the time unit information or a part of the time unit information.

Optionally, a time domain configuration of the first time unit may be obtained by using the first time unit indicator, a location of the first time unit may be learned of based on the time domain configuration of the first time unit, and a location of a second time unit may be learned of according to a distribution rule of the second time unit. A specific solution for obtaining the time domain configuration of the first time unit by using the first time unit indicator and learning of the location of the first time unit based on the time domain configuration of the first time unit may be obtained by replacing the second time unit in the third optional design with the first time unit. Details are not described herein again. For learning of the location of the second time unit by using the location of the first time unit and the distribution rule of the second time unit, refer to related content in the sixth or the seventh optional design. Details are not described herein again.

Optionally, a time domain configuration of the first time unit may be obtained by using the first time unit indicator, and a time domain configuration of a second time unit may be obtained based on the time domain configuration of the first time unit and a distribution rule of the second time unit, to learn of a location of the second time unit. A specific solution for obtaining the time domain configuration of the first time unit by using the first time unit indicator may be obtained by replacing the second time unit in the third optional design with the first time unit. For obtaining the time domain configuration of the second time unit based on the time domain configuration of the first time unit and the distribution rule of the second time unit, refer to related content in the sixth or the seventh optional design. Details are not described herein again.

Similar to the third optional design, the time domain configuration may be in a form of the foregoing index or bitmap. The time domain configuration may be used as the configuration information or a part of the configuration information.

In a ninth optional design, the time unit information may be a start location of the second time unit, that is, a location of a $1^{st}$ second time unit in the one or more second time units.

Optionally, a location of a second time unit in a time interval may be learned of by using a start location of the second time unit, a total quantity of time units included in the time interval (or an end location of the time interval), and a distribution rule of the second time unit. For example, the start location of the second time unit is a TU13, the total quantity of time units included in the time interval is 6, and the distribution rule of the second time unit is that the time interval is occupied as fully as possible. In this case, locations of second time units are the TU13, a TU14, and a TU15. For another example, the start location of the second time unit is a TU13, the end location of the time interval is a TU15, and the distribution rule of the second time unit is that the second time unit occupies the time interval as fully as possible and cannot be a last time unit in the time interval. In this case, locations of second time units are the TU13 and a TU14. The total quantity of time units included in the time interval (or the end location of the time interval) may be sent by the sending node to the receiving node, or may be agreed on in advance. The total quantity of time units included in the time interval (or the end location of the time interval) may be used as the configuration information or a part of the configuration information. The distribution rule of the second time unit may be sent by the sending node to the receiving node, or may be agreed on in advance. The distribution rule of the second time unit may be used as the configuration information or a part of the configuration information.

Optionally, a location of a second time unit in a time interval may be learned of by using a start location of the second time unit, a quantity of second time units (or an end location of the second time unit, that is, a location of a last second time unit in the one or more second time units), and a distribution rule of the second time unit. For example, the start location of the second time unit is a TU13, the quantity of second time units is 3, and the distribution rule of the second time unit is that the second time units are continuous in time domain. In this case, the TU13, a TU14, and a TU15 are second time units. For another example, the start location of the second time unit is a TU13, the end location of the second time unit is a TU15, and the distribution rule of the second time unit is that the second time units are continuous in time domain. In this case, the TU13, a TU14, and the TU15 are second time units. The quantity of second time units (or the end location of the second time unit) may be sent by the sending node to the receiving node, or may be agreed on in advance. The quantity of second time units (or the end location of the second time unit) may be used as the configuration information or a part of the configuration information. The distribution rule of the second time unit may be sent by the sending node to the receiving node, or may be agreed on in advance. The distribution rule of the second time unit may be used as the configuration information or a part of the configuration information.

Optionally, the start location of the second time unit may be obtained through detection. In this manner, control information is transmitted in a $1^{st}$ second time unit in a time interval, and a location of a time unit in which the receiving node detects the control information may be considered as a start location of a second time unit in the time interval.

Figure 10:
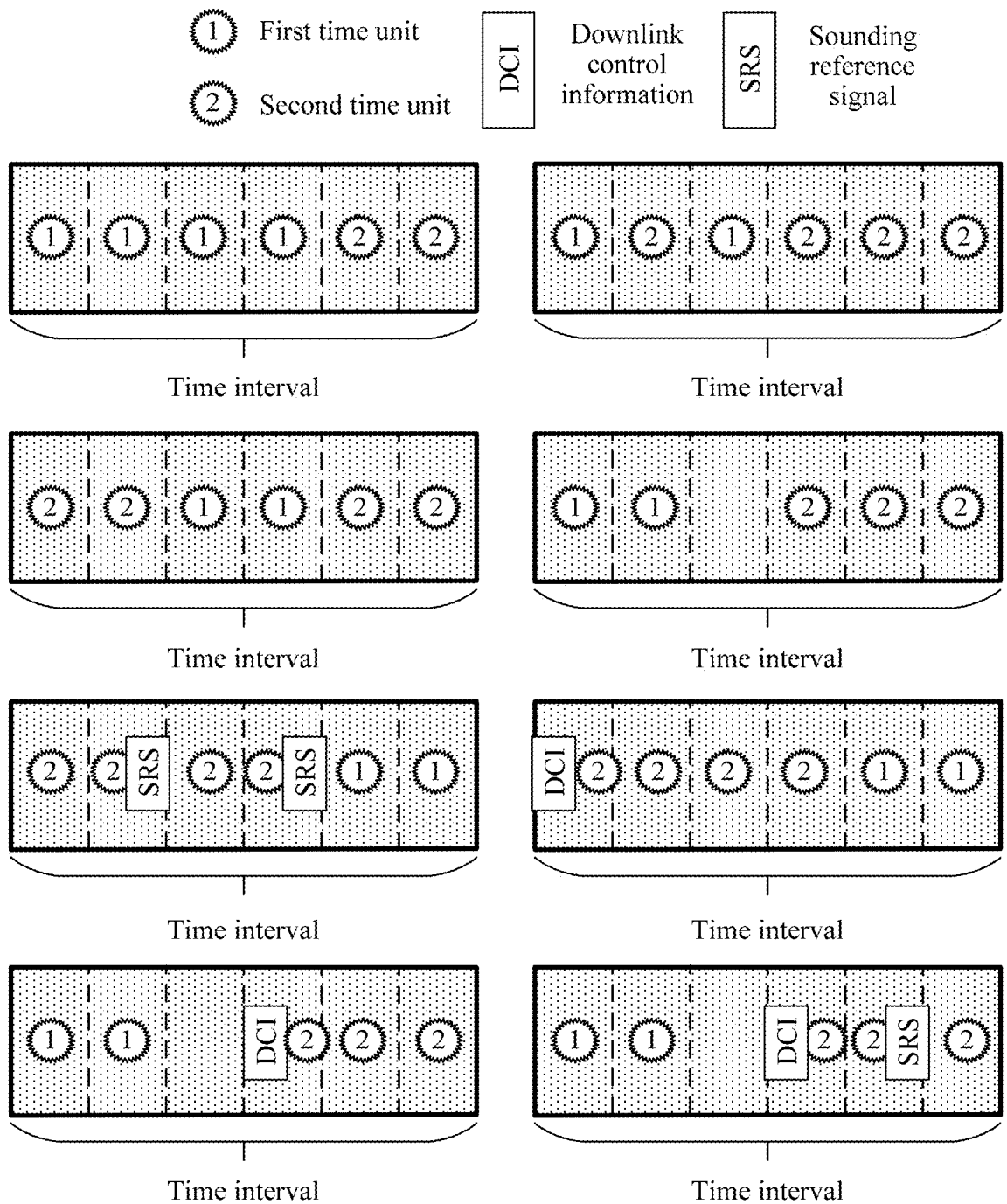
FIG. 10 is a schematic diagram of distribution of a first time unit and a second time unit.

Persons skilled in the art should know that there may be a plurality of possibilities of distribution of the first time unit and the second time unit in the time interval. This is not limited in this embodiment of this application. FIG. 10 describes merely some possibilities for reference.

Persons skilled in the art should know that the foregoing different designs may be combined and replaced depending on different network requirements.

In the foregoing different designs, the time unit information may also be used as the configuration information or a part of the configuration information.

In the foregoing different designs, the time unit information and the configuration information may be sent to the receiving node in different manners, or may be sent to the receiving node in a same piece of signaling. For example, the time unit information or the configuration information may be sent in a manner such as by using broadcast information, a system message, higher layer signaling, or downlink control information. The sending node that sends the configuration information and the sending node that transmits the second-type signal with the receiving node may be a same node, or may be different nodes.

According to the transmission method, the receiving node, and the sending node that are provided in the embodiments of the present application, the time unit that can be used to transmit the second-type signal is dynamically indicated, and allocation of time domain resources in the time interval may vary with the quantity of first-type signals, to avoid a resource waste caused by reserving a fixed resource for the first-type signal, and improve transmission efficiency. In addition, signal transmission is more flexible.

In the several embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected depending on actual requirements to achieve the objectives of the solutions of the embodiments.

In addition, functional units in the embodiments of this application may be integrated into one processing unit, or each of the units may exist alone physically, or at least two units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, a network device, or the like) or a processor to perform some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

It may be clearly understood by persons skilled in the art that, for the purpose of convenient and brief description, division of the foregoing functional modules is used as an example for description. In actual application, the foregoing functions may be allocated to different functional modules for implementation depending on a requirement. To be specific, an inner structure of an apparatus is divided into different functional modules to implement all or some of the functions described above. For a detailed working process of the foregoing apparatus, refer to a corresponding process in the foregoing method embodiments, and details are not described herein again.

Persons of ordinary skill in the art may understand that first, second, and various reference numerals in this specification are only for a distinguishing purpose for ease of description, and are not used to limit the scope of the embodiments of this application.

Persons of ordinary skill in the art may understand that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to the embodiments of the present application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (Solid State Disk, SSD)), or the like.

Finally, it should be noted that the foregoing embodiments are merely intended to describe the technical solutions of this application, but not to limit this application. Although this application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of this application.

What is claimed is:

1. A method for transmission in a time interval, wherein the method comprises:
    obtaining, by a receiving node, time unit information, wherein the time unit information is used to obtain a location of a time domain resource of a second-type time-frequency resource in the time interval, and wherein the time interval comprises a time domain resource of a first-type time-frequency resource and the time domain resource of the second-type time-frequency resource, the time domain resource of the first-type time-frequency resource is one or more first time units, the first-type time-frequency resource is used to transmit a first-type signal, a quantity of the one or more first time units is associated with a quantity of first-type signals, duration of each time unit of the one or more first time units is equal to duration of a synchronization signal block, and the first-type signal is a synchronization signal, and wherein:
        an index of the one or more first time units is used as the time unit information or a part of the time unit information; or
        a bitmap of the one or more first time units is used as the time unit information or a part of the time unit information;
    receiving or locally obtaining, by the receiving node, configuration information, wherein the location of the time domain resource of the second-type time-frequency resource is obtained based on at least the time unit information and the configuration information; and
    receiving, by the receiving node, a second-type signal on the second-type time-frequency resource, wherein the second-type signal is a data channel signal.

2. The method according to claim 1, wherein
    duration of the time interval is used as the configuration information or a part of the configuration information; or
    duration of a time unit is used as the configuration information or a part of the configuration information; or a distribution rule of the one or more first time units is used as the configuration information or a part of the configuration information; or a time domain configuration of the one or more first time units is used as the configuration information or a part of the configuration information.

3. The method according to claim 2, wherein the obtaining, by a receiving node, time unit information comprises:
receiving, by the receiving node, the time unit information.

4. The method according to claim 3, wherein the receiving, by the receiving node, the time unit information comprises:
receiving, by the receiving node, the time unit information by using a broadcast message, system information, or higher layer signaling.

5. A method for transmission in a time interval, wherein the method comprises:
sending, by a sending node, time unit information, wherein the time unit information is used to obtain a location of a time domain resource of a second-type time-frequency resource in the time interval, and wherein
the time interval comprises a time domain resource of a first-type time-frequency resource and the time domain resource of the second-type time-frequency resource, the time domain resource of the first-type time-frequency resource is one or more first time units, the first-type time-frequency resource is used to transmit a first-type signal, a quantity of the one or more first time units is associated with a quantity of first-type signals, duration of each time unit of the one or more first time units is equal to duration of a synchronization signal block, and the first-type signal is a synchronization signal, and wherein:
an index of the one or more first time units is used as the time unit information or a part of the time unit information; or
a bitmap of the one or more first time units is used as the time unit information or a part of the time unit information;
sending, by the sending node, configuration information, wherein the location of the time domain resource of the second-type time-frequency resource is obtained based on at least the time unit information and the configuration information; and
sending, by the sending node, a second-type signal on the second-type time-frequency resource, wherein the second-type signal is a data channel signal.

6. The method according to claim 5, wherein
duration of the time interval is used as the configuration information or a part of the configuration information; or
duration of a time unit is used as the configuration information or a part of the configuration information; or
a distribution rule of the one or more first time units is used as the configuration information or a part of the configuration information; or
a time domain configuration of the one or more first time units is used as the configuration information or a part of the configuration information.

7. A receiving apparatus, comprising:
a transceiver;
at least one processor; and
one or more memories coupled to the at least one processor and storing programming instructions for execution by the at least one processor to cause the apparatus to :

obtain time unit information by using the transceiver, wherein the time unit information is used to obtain a location of a time domain resource of a second-type time-frequency resource in a time interval, the time interval comprises a time domain resource of a first-type time-frequency resource and the time domain resource of the second-type time-frequency resource, the time domain resource of the first-type time-frequency resource is one or more first time units, the first-type time-frequency resource is used to transmit a first-type signal, a quantity of the one or more first time units is associated with a quantity of first-type signals, duration of each time unit of the one or more first time units is equal to duration of a synchronization signal block, and the first-type signal is a synchronization signal, and wherein:
an index of the one or more first time units is used as the time unit information or a part of the time unit information; or
a bitmap of the one or more first time units is used as the time unit information or a part of the time unit information;
receive or locally obtain configuration information, wherein the location of the time domain resource of the second-type time-frequency resource is obtained based on at least the time unit information and the configuration information; and
receive a second-type signal on the second-type time-frequency resource by using the transceiver, wherein the second-type signal is a data channel signal.

8. The receiving apparatus according to claim 7, wherein
duration of the time interval is used as the configuration information or a part of the configuration information; or
duration of a time unit is used as the configuration information or a part of the configuration information; or
a distribution rule of the one or more first time units is used as the configuration information or a part of the configuration information; or
a time domain configuration of the one or more first time units is used as the configuration information or a part of the configuration information.

9. The receiving apparatus according to claim 8, wherein the one or more memories store programming instructions for execution by the at least one processor to cause the apparatus to receive the time unit information by using the transceiver.

10. The receiving apparatus according to claim 9, wherein the one or more memories store programming instructions for execution by the at least one processor to cause the apparatus to receive a broadcast message, system information, or higher layer signaling by using the transceiver, wherein the broadcast message, the system information, or the higher layer signaling comprises the time unit information.

11. A sending apparatus, comprising:
a transceiver;
at least one processor; and
one or more memories coupled to the at least one processor and storing programming instructions for execution by the at least one processor to cause the apparatus to :
send time unit information by using the transceiver, wherein the time unit information is used to obtain a location of a time domain resource of a second-type time-frequency resource in a time interval, wherein the time interval comprises a time domain resource of a first-type time-frequency resource and the time domain resource of the second-type time-frequency resource, the time domain resource of the first-type time-frequency resource is one or more first time units, the first-type time-frequency resource is used to transmit a first-type signal, a quantity of the one or more first time units is associated with a quantity of first-type signals, duration of each time unit of the one or more first time units is equal to duration of a synchronization signal block, and the first-type signal is a synchronization signal, and wherein:
  an index of the one or more first time units is used as the time unit information or a part of the time unit information; or
  a bitmap of the one or more first time units is used as the time unit information or a part of the time unit information;
send configuration information, wherein the location of the time domain resource of the second-type time-frequency resource is obtained based on at least the time unit information and the configuration information; and
send a second-type signal on the second-type time-frequency resource by using the transceiver, wherein the second-type signal is a data channel signal.

12. The sending apparatus according to claim 11, wherein
duration of the time interval is used as the configuration information or a part of the configuration information; or
duration of a time unit is used as the configuration information or a part of the configuration information; or
a distribution rule of the one or more first time units is used as the configuration information or a part of the configuration information; or
a time domain configuration of the one or more first time units is used as the configuration information or a part of the configuration information.

* * * * *